US008432341B2

(12) United States Patent
Shirai et al.

(10) Patent No.: US 8,432,341 B2
(45) Date of Patent: Apr. 30, 2013

(54) COLOR SEQUENCE CONTROL FOR VIDEO DISPLAY APPARATUS

(75) Inventors: Akira Shirai, Tokyo (JP); Fusao Ishii, Menlo Park, CA (US)

(73) Assignee: Silicon Quest Kabushiki-Kaisha (JP)

( * ) Notice: Subject to any disclaimer, the term of this patent is extended or adjusted under 35 U.S.C. 154(b) by 1073 days.

(21) Appl. No.: 12/381,590

(22) Filed: Mar. 13, 2009

(65) Prior Publication Data

US 2009/0174824 A1   Jul. 9, 2009

Related U.S. Application Data

(63) Continuation-in-part of application No. 12/074,033, filed on Mar. 1, 2008, now abandoned, and a continuation-in-part of application No. 11/121,543, filed on May 4, 2005, now Pat. No. 7,268,932, and a continuation-in-part of application No. 10/698,620, filed on Nov. 1, 2003, now abandoned, said application No. 11/121,543 is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903, 860.

(60) Provisional application No. 61/069,419, filed on Mar. 15, 2008.

(51) Int. Cl.
*G09G 3/34* (2006.01)

(52) U.S. Cl.
USPC .............................. 345/84; 345/89; 345/690

(58) Field of Classification Search .............. 345/82–89, 345/102, 690; 359/629, 630
See application file for complete search history.

(56) References Cited

U.S. PATENT DOCUMENTS

| 5,214,420 | A |   | 5/1993 | Thompson et al. |
| 5,285,407 | A |   | 2/1994 | Gale et al. |
| 5,589,852 | A | * | 12/1996 | Thompson et al. ........... 345/690 |
| 6,453,067 | B1 |   | 9/2002 | Morgan et al. |
| 6,520,648 | B2 |   | 2/2003 | Stark et al. |
| 6,561,654 | B2 |   | 5/2003 | Mukawa et al. |
| 6,567,134 | B1 |   | 5/2003 | Morgan |
| 6,683,657 | B1 | * | 1/2004 | Miyawaki ..................... 348/743 |
| 6,726,333 | B2 |   | 4/2004 | Huibers et al. |
| 6,828,954 | B2 | * | 12/2004 | Yoshihara et al. ............ 345/102 |
| 6,870,523 | B1 |   | 3/2005 | Ben-David et al. |
| 6,876,764 | B2 |   | 4/2005 | Lee et al. |
| 6,911,963 | B2 |   | 6/2005 | Baba et al. |
| 7,027,105 | B2 |   | 4/2006 | Lee et al. |
| 7,129,955 | B2 |   | 10/2006 | Motomura |
| 7,131,762 | B2 |   | 11/2006 | Richards et al. |
| 7,167,150 | B2 |   | 1/2007 | Yang et al. |
| 2002/0163490 | A1 | * | 11/2002 | Nose ................................ 345/89 |
| 2003/0020677 | A1 | * | 1/2003 | Nakano ........................... 345/87 |
| 2003/0085857 | A1 | * | 5/2003 | Ramanujan ..................... 345/87 |

* cited by examiner

*Primary Examiner* — Kimnhung Nguyen
(74) *Attorney, Agent, or Firm* — Bo-In Lin

(57) ABSTRACT

A video display apparatus is provided, comprising: a light source(s) controllable for emitting a plurality of reference colors; a color conversion circuit received an input video signal for generating the color data of at least one correction color for correcting a reference color emitted from a light source; an image processing unit receives the input video signal for generating an output video signal comprising a plurality of sub-frame signals; and a control circuit applies the color data generated by the color conversion circuit for controlling a light source to display color images.

17 Claims, 25 Drawing Sheets

COLOR SEQUENCE CONTROL FOR VIDEO DISPLAY APPARATUS

This application is a Non-provisional Application of a Provisional Application 61/069,419 filed on Mar. 15, 2008 and a Continuation in Part Application of a Non-provisional Patent Application 12/074,033 filed on Mar. 1, 2008 now abandoned. This Application is further a Continuation in Part Application of a Non-provisional Patent Application 11/121,543 filed on May 4, 2005 issued into U.S. Pat. No. 7,268,932 and another Non-provisional Application 10/698,620 filed on Nov. 1, 2003 now abandoned. The application Ser. No. 11/121,543 is a Continuation In Part (CIP) Application of three previously filed Applications. These three Applications are Ser. No. 10/698,620 filed on Nov. 1, 2003, now abandoned Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to a video display apparatus. More particularly, this invention relates to a video display apparatus employing a color sequence control process by mixing reference colors emitted from a light source or sources included implemented by an image display apparatus in addition to suppressing the occurrence of color breakup in a color sequential display and control process, thereby matching a predefined target reference color.

2. Description of the Related Art

Even though there have been significant advances in the technologies implementing electromechanical micromirror devices such as SLMs in recent years, there are still limitations and difficulties when they are employed to provide a high quality image. Specifically, when the images are digitally controlled, the image quality is adversely affected due to the fact that the images are not displayed with a sufficient number of gray scales.

Electromechanical micromirror devices are drawing considerable interest as SLMs. Electromechanical micromirror devices consist of "a mirror array" arraying a large number of mirror elements. In general, the mirror elements, ranging from 60,000 to several million, are arrayed on a surface of a substrate in an electromechanical micromirror device. Referring to FIG. 1A for an image display system 1 including a screen 2 is disclosed in reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array including switchable reflective elements 17, 27, 37, and 47 each comprising a mirror 33 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge upon the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the narrowest pulse width as control related to the ON or OFF state. Since the mirror is controlled to operate in either an ON or OFF state, the conventional image display apparatuses have no way to provide a pulse width to control the mirror that is shorter than the control duration allowable according to the LSB. The smallest quantity of light, which determines the smallest amount of adjustable brightness for adjusting the gray scale, is the light reflected during the time duration according to the narrowest pulse width. The limited gray scale due to the LSB limitation leads to a degradation of the quality of the display image.

Specifically, FIG. 1C shows a control circuit for controlling a mirror element according to the disclosure in U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors, while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32—written data is accessed when the transistor M9 that has received the ROW signal on a Word-line is turned on. The latch 32a consists of two cross-coupled inverters, i.e., M5/M6 and M7/M8, which permit two stable states; state 1 is Node A high and Node B low and state 2 is Node A low and Node B high.

The control circuit as illustrated in FIG. 1C controls the mirrors to switch between two states and the control circuit drives the mirror to oscillate to either an ON or OFF deflected angle (or position) as shown in FIG. 1A. The minimum quantity of light controllable to reflect from each mirror element for image display, i.e., the image display gray scale resolution for a digitally controlled image display apparatus, is determined by the shortest length of time that the mirror is controllable to hold at the ON position. The length of time that each mirror is controlled to hold at an ON position is in turn controlled by multiple bit words.

FIG. 1D shows the "binary time durations" in the case of controlling SLM by four-bit words. As shown in FIG. 1D, the time durations have relative values of 1, 2, 4, and 8 that in turn determine the relative quantity of light of each of the four bits, where the "1" is the least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with an n-bit word for controlling the gray scale, one frame time is divided into $(2^n-1)$ equal time slices. If one frame time is 16.7 msec. each time slice is $16.7/(2^n-1)$ msec.

Having set these time lengths for each pixel in each frame of the image, the quantity of light in a pixel which is quantified as 0 time slices is black (no quantity of light), 1 time slice is the quantity of light represented by the LSB, and 15 time slices (in the case of n=4) is the quantity of light represented by the maximum brightness. On the basis of the quantity of light being quantified, the time of a mirror holding at the ON position during one frame duration is determined by each pixel. Thus, each pixel with a quantified value that is more than 0 time slices is displayed by the mirror holding at an ON position with the number of time slices corresponding to its quantity of light during one frame duration. The viewer's eye integrates the brightness of each pixel so that the image is displayed as if the image were generated with analog levels of light.

For controlling deflectable micromirror devices, the PWM calls for the data to be formatted into "bit-planes", where each bit-plane corresponds to a bit weight of the quantity of light. Thus, when the brightness of each pixel is represented by an n-bit value, each frame of data has n-bit-planes. Then, each bit-plane has a 0 or 1 value for each mirror element. In the PWM described in the preceding paragraphs, each bit-plane is independently loaded and the mirror elements are controlled according to bit-plane values corresponding to them during one frame. For example, the bit-plane representing the LSB of each pixel is displayed as 1 time slice.

In the meantime, one of the color image display methods is a commonly known as a color sequential method. This is a method for dividing one frame signal into a plurality of reference color components and sequentially displaying the respective reference color component in a short period of time, thereby attaining a desired color image display. Furthermore, the reference colors use, for example, red (R), green (G) and blue (B). The color sequential method utilizes the fact that short display periods of the color components causes the reference color components to appear to be overlapping to the human eye and, thus, synthesized rather than as individual colors. This is due to limitations of the human eye.

However, if the display period of each reference color component is not sufficiently short so that the components appear synthesized to the human eye, that is, if a frame rate is not sufficiently rapid, this results in the generation of a phenomenon called color breakup (i.e., color separation) and degrades in the image quality.

Therefore, a conventional method is utilized to generate a plurality of sub-frames and then each reference color is displayed once in each sub-frame in order to increase the frame rate instead of dividing a frame signal received as input into a video display apparatus with a certain frame rate. The frame rate is simply the number of reference colors used to display the divided frames.

FIG. 2 illustrates dividing a frame 100 of a 60 Hz frame rate into six sub-frames (i.e., sub-frames 110, 120, 130, 140, 150, and 160) for a display.

Each sub-frame period is further divided into periods of red (R), green (G) and blue (B), and displayed in that order. With this configuration, a color image 105 corresponding to the frame is displayed by color images 115, 125, 135, 145, 155, and 165 for the individual sub-frames for a total of six times, which means that a color image 105 is reproduced at a 360 Hz frame rate in terms of color display.

With this color control and display process, the human eye distinguishes frames at a slower rate than the frame rate (i.e., 360 Hz in the example shown in FIG. 2) related to a color display that is the generation cycle of sub-frames, and thereby it is possible to suppress the occurrence of color breakup (i.e., color separation).

Another problem that degrades the reproducibility of a color display is when a light source included in an image display apparatus is different from the desired reference color due to an individual difference in the light source. In such a case, even if a countermeasure to degradation in image quality, such as suppressing the occurrence of color breakup (i.e., color separation) is devised (as described above), it is not possible to express, in high fidelity, a color image represented by the input frame signal. Furthermore, the above described difference is also generated by a secular change due to the light source being used for an extended period of time. Therefore, it is necessary to provide an image display apparatus allowing for the adjustment of the above described difference not only at the initial shipment of the product but also after its use has begun.

SUMMARY OF THE INVENTION

In consideration of the above described difficulties and limitations, one aspect of the present invention is to provide a video display apparatus to reproduce a color image represented by the input video signal in high fidelity by mixing reference colors emitted from a light source or sources included implemented by an image display apparatus in addition to suppressing the occurrence of color breakup in a color sequential display and control process, thereby matching a predefined target reference color.

One exemplary embodiment of the present invention provides a video display apparatus comprising: an adjustable light source for emitting a plurality colors; a color distribution determination circuit receives and applies an input video signal comprising a plurality of color data to determine and change a color distribution for displaying an image; and a control circuit receives the color distribution from the color determination circuit and applies the color distribution for controlling and changing the adjustable light source for displaying video images with color distribution determined and changed by the color distribution determination circuit.

BRIEF DESCRIPTION OF THE DRAWINGS

The present invention is described in detail below with reference to the following figures.

DESCRIPTION OF THE PREFERRED EMBODIMENTS

Preferred embodiments according to the present invention are described below with reference to the accompanying drawings.

First Preferred Embodiment

Figure 1A:
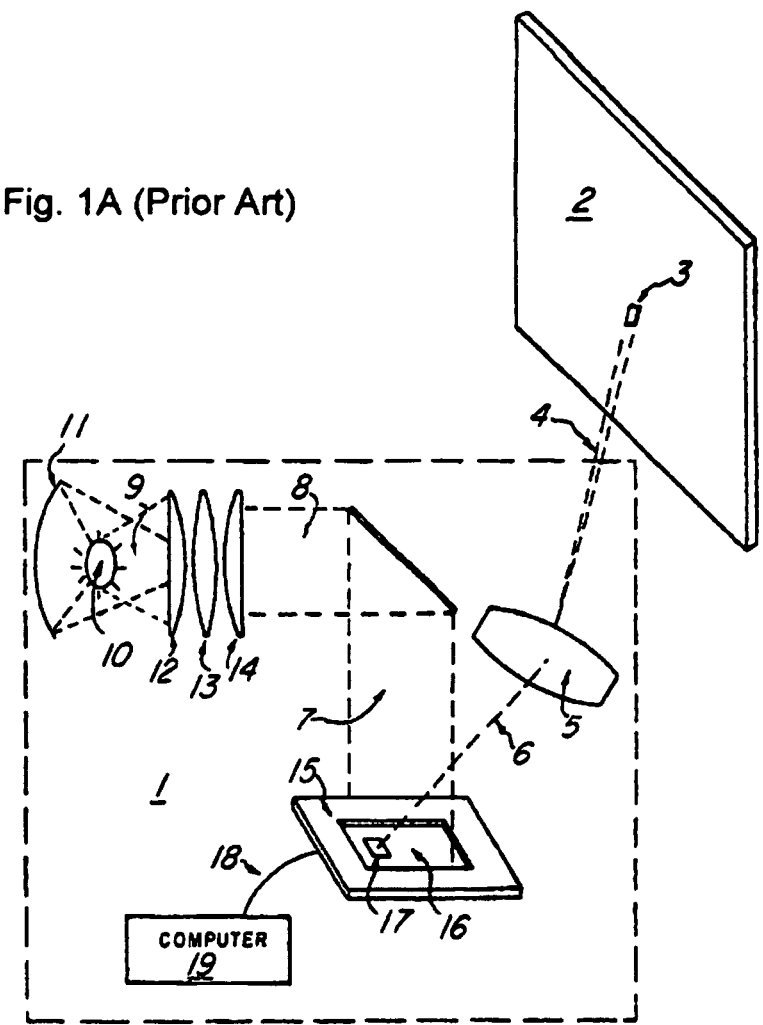
FIG. 1A is a schematic diagram for showing a conventional two-dimensional digital video system using a deflectable micromirror device.
Figure 1B:
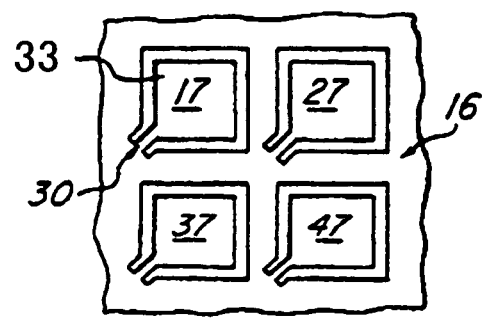
FIG. 1B is a schematic diagram for showing a part of the deflectable micromirror device shown in FIG. 1A.
Figure 1C:
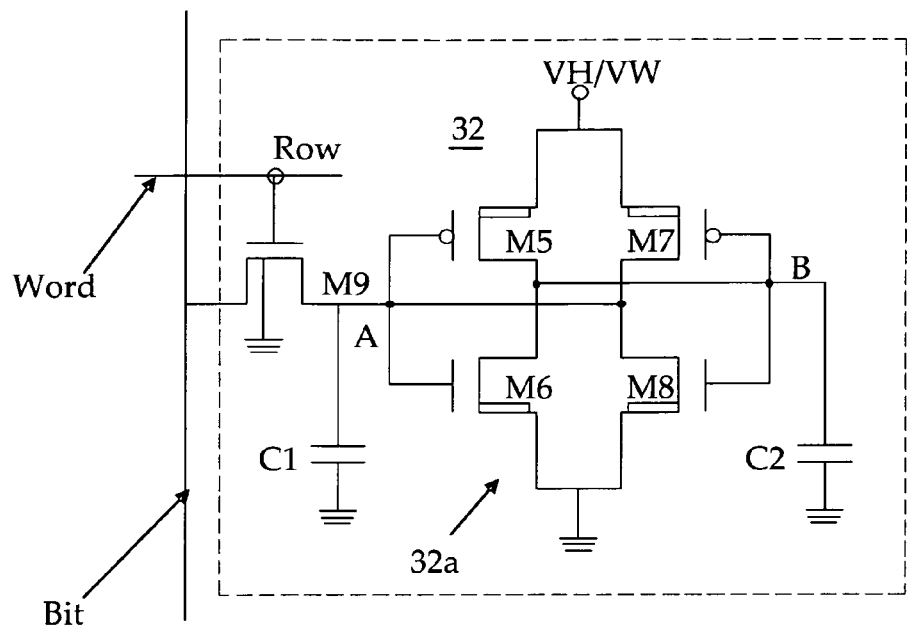
FIG. 1C is a circuit diagram for showing a conventional control circuit of a micromirror.
Figure 1D:
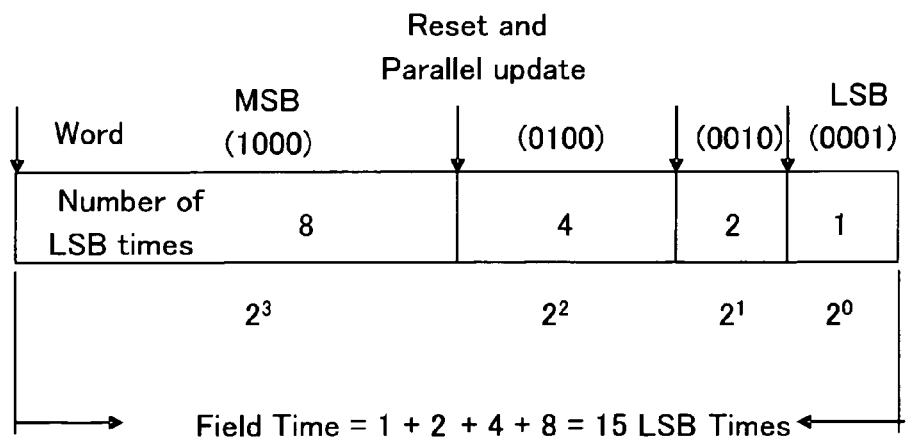
FIG. 1D is a schematic diagram for showing binary time intervals when a control is performed with 4-bit words.
Figure 2:
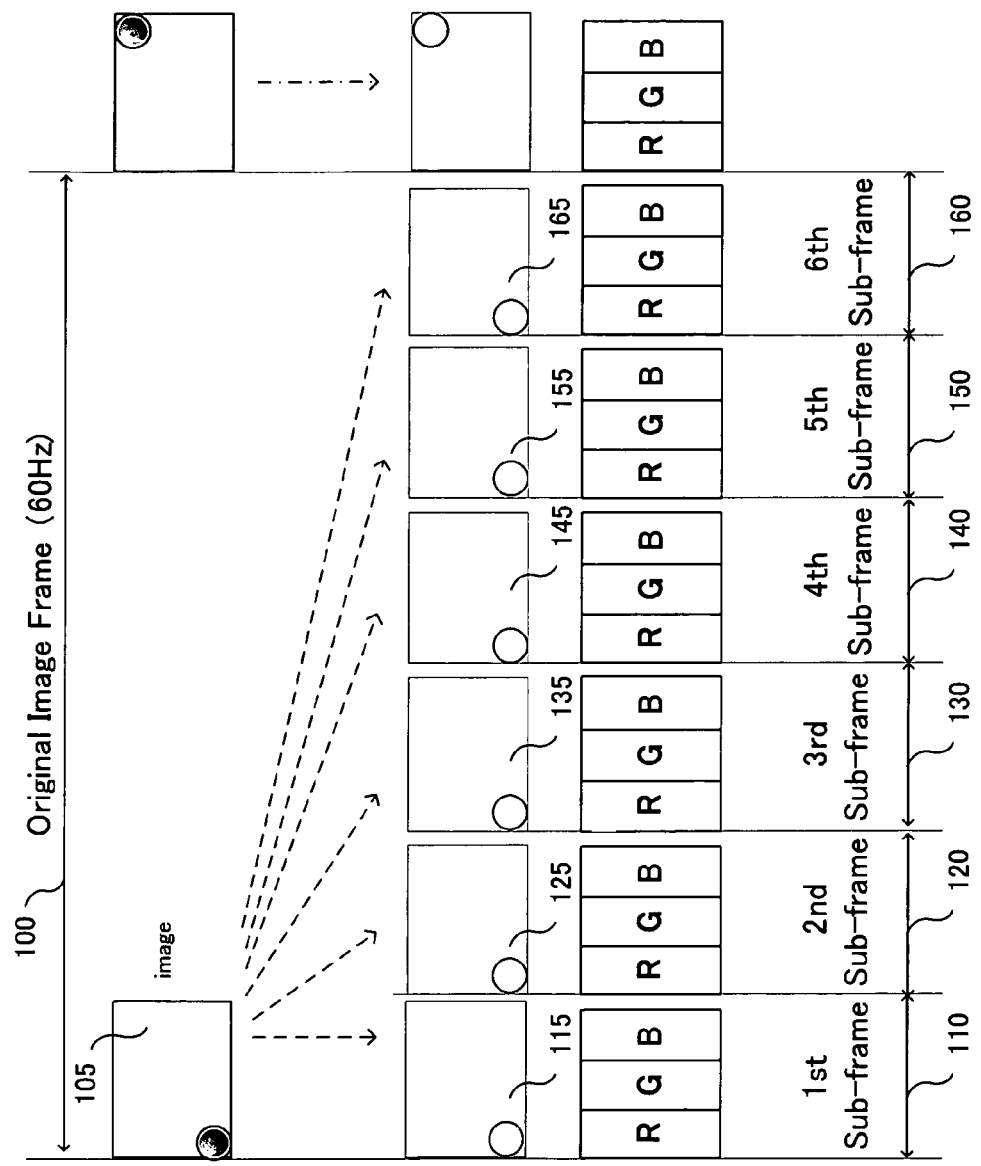
FIG. 2 is a diagram showing an example operation of a video display apparatus according to a conventional technique.
Figure 3:
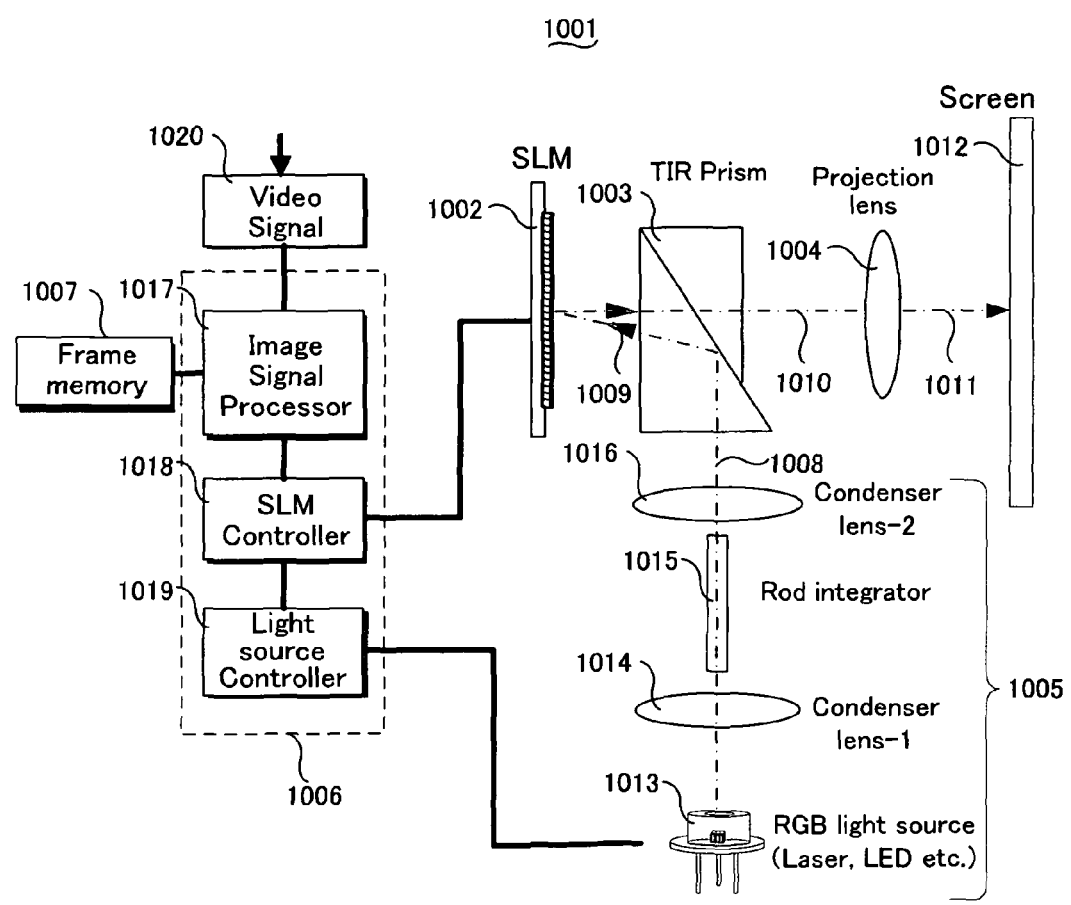
FIG. 3 is a functional diagram for showing a system configuration of a video display apparatus according to a preferred embodiment of the present invention.

FIG. 3 is a diagram showing an example comprisal of a video display apparatus according to a preferred embodiment of the present invention.

As shown in FIG. 3, the video display system 1001 includes one spatial light modulator (SLM) 1002, a total internal reflection (TIR) prism 1003, a projection optical system 1004, a light source optical system 1005, a display processing unit 1006, and a frame memory 1007.

The SLM 1002 and TIR prism 1003 are placed in the optical axis of the projection optical system 1004, and the light source optical system 1005 is placed in a manner such that the optical axis thereof is aligned with that of the projection optical system 1004.

The TIR prism 1003 causes 1) an illumination light 1008 incoming from the light source optical system 1005 placed onto the side to enter the SLM 1002 at a prescribed inclination angle relative thereto as incident light 1009 and 2) a reflection light 1010 reflected by the SLM 1002 to transmit itself so as to reach the projection optical system 1004.

The projection optical system 1004 projects the reflection light 1010, as projection light 1011, incoming by way of the SLM 1002 and TIR prism 1003 to a screen 1012 or the like.

The light source optical system 1005 comprises a variable light source 1013 for generating the illumination light 1008, a first condenser lens 1014 for focusing the illumination light 1008, a rod type condenser body 1015, and a second condenser lens 1016.

The variable light source 1013, first condenser lens 1014, rod type condenser body 1015, and second condenser lens 1016 are sequentially placed in the aforementioned order in the optical axis of the illumination light 1008, which is emitted from the variable light source 1013 and incident to the side face of the TIR prism 1003.

The variable light source 1013 includes a red (R) semiconductor light source, a green (G) semiconductor light source, and a blue (B) semiconductor light source (which are not shown in a drawing here), which allow independent controls for the light emission states.

Note that the semiconductor light source may employ a laser light source, a light emitting diode (LED), or the like. In the present embodiment, the assumption is that a laser light source is employed.

The color laser lights may be used as the illumination light 1008 emitting not only the respective color lights but also a synthesized light constituted by two or more laser lights from among the three laser light sources obtained by causing two or more of the three laser light sources to emit light. For example, the illumination light 1008 can be changed to a white light by causing the three laser light sources R, G, and B to emit light simultaneously. Further, the respective laser light sources may emit light in temporal sequence. With such controls, the video display system 1001 is enabled not only to produce a monochrome display but also to produce a color display on the screen 1012 by means of a color sequential method using one SLM 1002.

The display processing unit 1006 comprises an image signal processing unit 1017 for processing a continuously input video signal 1020, an SLM controller 1018 for controlling the SLM 1002, and a light source controller 1019 for controlling the variable light source 1013.

The frame memory 1007 is memory used for temporarily storing an input video signal 1020. Incidentally, the frame memory 1007 is also used as working memory for the image signal processing unit 1017.

Figure 4:
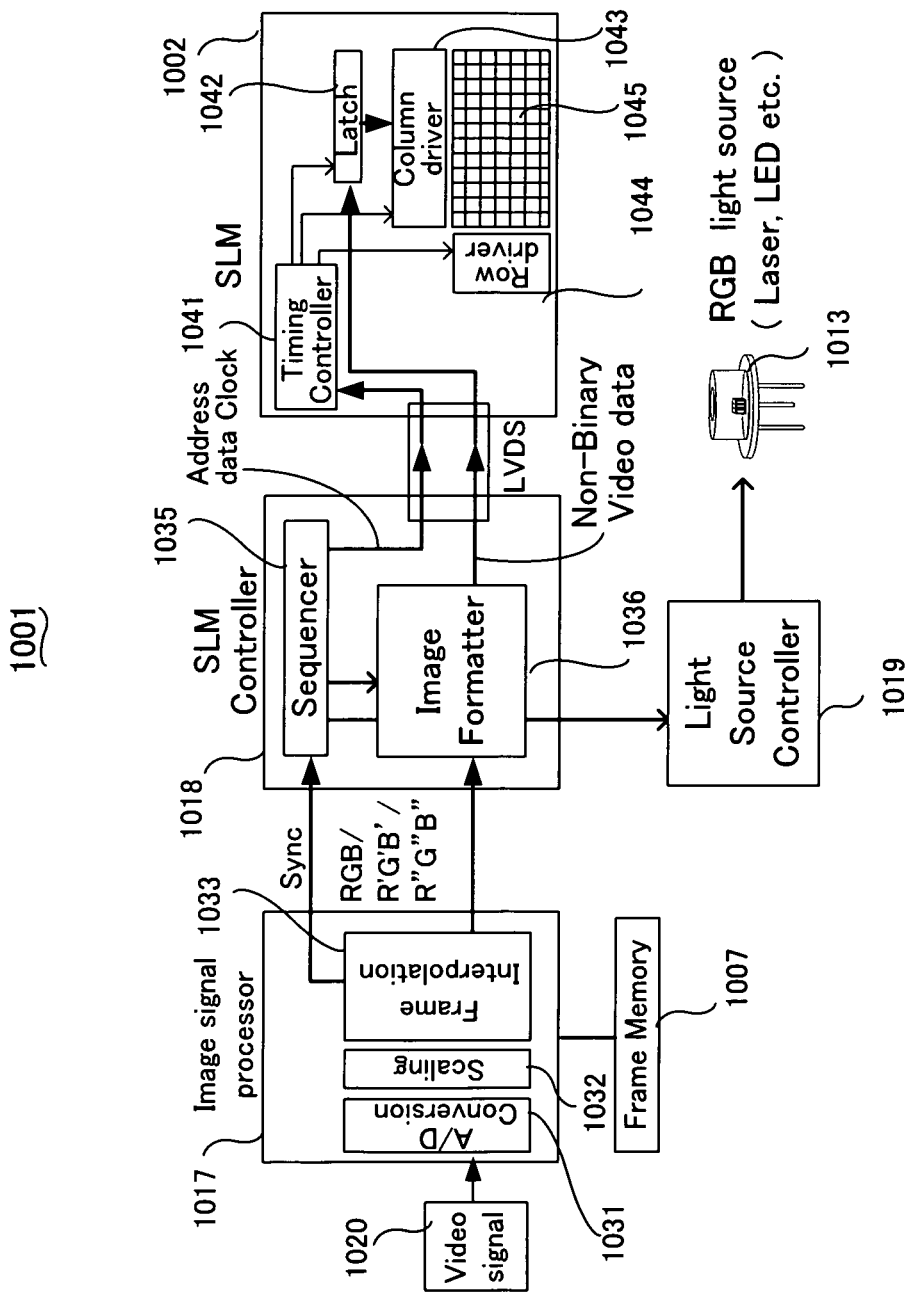
FIG. 4 is a block diagram showing a circuit configuration of a video display apparatus according to a preferred embodiment of the present invention.

FIG. 4 is a block diagram showing a specific circuit configuration of the above described image signal processing unit 1017 and SLM controller 1018. As shown in FIG. 4, the image signal processing unit 1017 comprises an AD converter 1031, a scaling unit 1032, and a frame interpolation unit 1033.

The AD converter 1031 converts an analog signal into a digital signal if the input video signal 1020 is the analog signal, and outputs the post-conversion signal. If the input resolution of the input video signal 1020 is different from the resolution of the video display system 1001, the scaling unit 1032 executes a scaling process to the signal output from the AD converter 1031 and converts the resolution of the input video signal 1020 into that of the video display system 1001.

The frame interpolation unit 1033 generates a video signal that is "sub-framed" (that is, the input video signal is divided into sub-frames) at a higher frame rate on the basis of the input video signal. For example, it generates the video signals of the second red (R'), green (G'), and blue (B') signals and the third red (R"), green (G"), and blue (B") signals on the basis of first red (R), green (G), and blue (B) signals as described later.

The present embodiment is configured such that the second red (R') signal and third red (R") signal, while having a primary component of red, partially contain a color component(s) emitted from a laser light source(s) other than the red laser light source. Note that the second red (R') signal and third red (R") signal contain different ratios of color components than those emitted from laser light sources other than the red laser light source.

Furthermore, the second green (G') signal and third green (G") signal, while having a primary component of green, partially contain a color component(s) emitted from a laser light source(s) other than the green laser light source. Note that the second green (G') signal and third green (G") signal contain different ratios of color components than those emitted from laser light sources other than the green laser light source.

Furthermore, the second blue (B') signal and third blue (B") signal, while having a primary component of blue, partially contain a color component(s) emitted from a laser light source(s) other than the blue laser light source. Note that the second blue (B') signal and third blue (B") signal contain different ratios of color components than those emitted from laser light sources other than the blue laser light source.

In contrast, the first red (R) signal, green (G) signal, and blue (B) signal each contain only the respective color components emitted from the red, green, and blue laser light sources.

Furthermore, the frame interpolation unit 1033 generates a frame synchronous signal (Sync) in accordance with the frame signal of the generated higher frame video signal and outputs the generated signal.

The SLM controller 1018 comprises a sequencer 1035 and an image formatter 1036. The sequencer 1035 controls the operation timings of the image formatter 1036, SLM 1002, and light source controller 1019, in accordance with a frame synchronous signal which is output from the frame interpolation unit 1033.

The image formatter 1036 generates, on the basis of the sub-framed video signal output from the frame interpolation unit 1033, display-use data used for controlling the SLM 1002, and outputs the generated display-use data.

The SLM 1002 is connected to the SLM controller 1018 by way of a transmission path compliant with a Low-Voltage Differential Signaling (LVDS) Standard, and comprises a timing controller 1041, a latch circuit 1042, a Column driver 1043, a Row driver 1044, and a pixel element array 1045 in which a plurality of pixel elements is placed in an array (noted as "arrayed" hereinafter).

The timing controller 1041 controls the operation timings of the latch circuit 1042, Column driver 1043, and Row driver 1044 in accordance with a timing signal (Address data Clock) which is output from the sequencer 1035.

The latch circuit 1042 retains the video data which is output from the image formatter 1036 temporarily and supplies the Column driver 1043 with the video data.

The individual pixel elements of the pixel element array 1045 are controlled by driving the Column driver 1043 and Row driver 1044.

The light source controller 1019 controls the emission of the laser light source (i.e., the variable light source 1013) on the basis of the instruction of the operation timing from the sequencer 1035 so as to reproduce the sub-framed video signal generated by the frame interpolation unit 1033.

Figure 5:
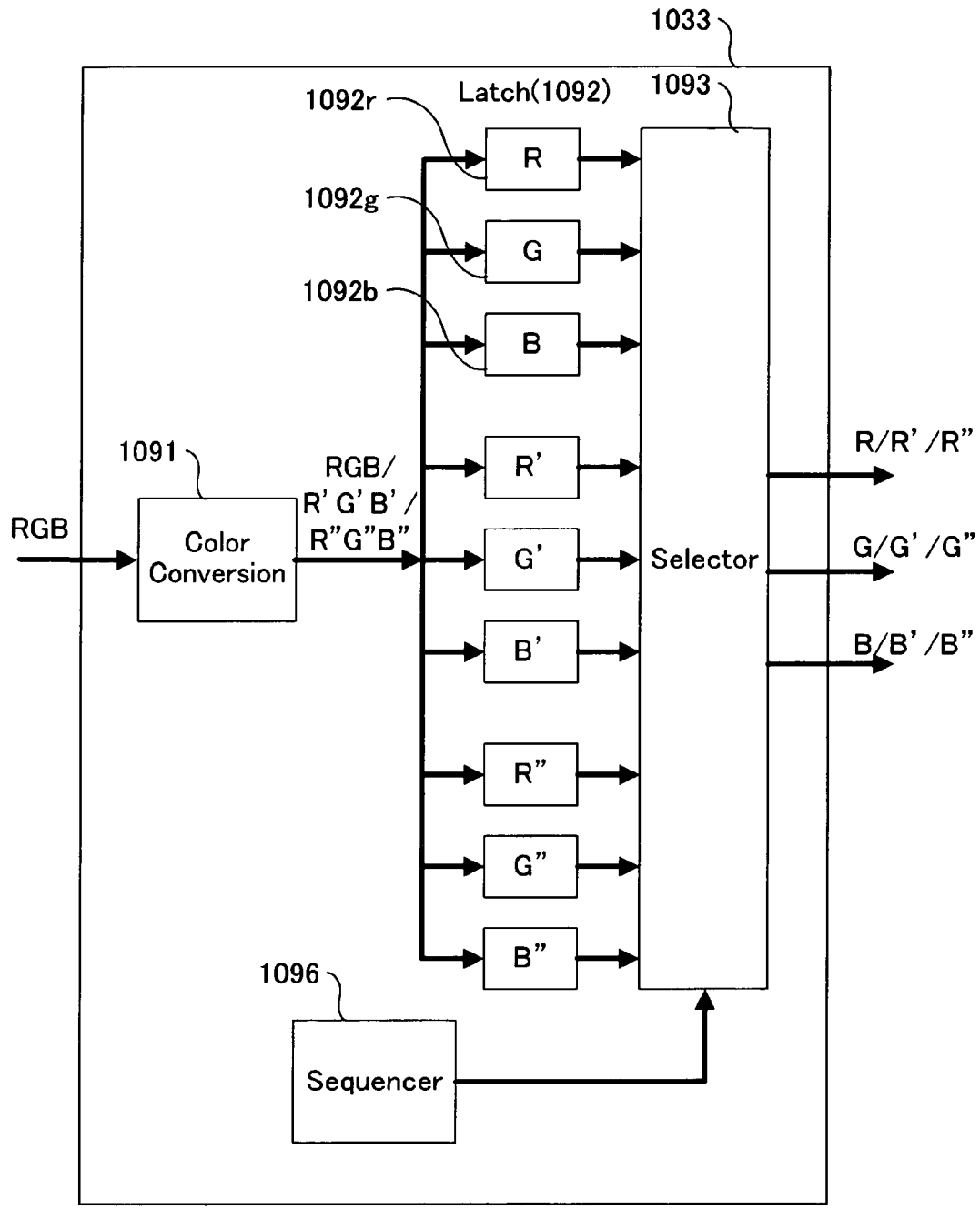
FIG. 5 is a block diagram showing a circuit configuration of a frame interpolation unit according to a preferred embodiment of the present invention.

FIG. 5 is a block diagram for showing a circuit configuration of the frame interpolation unit 1033.

As shown in FIG. 5, the frame interpolation unit 1033 includes a color conversion unit 1091, a latch 1092, a selector 1093, and a sequencer 1096.

Note that the sequencer 1096, being different from the sequencer included in the SLM controller 1018 illustrated in FIG. 4, controls only the frame interpolation unit 1033.

The frame signal that is input into the frame interpolation unit 1033 is converted by the color conversion unit 1091 into the respective color component signals, i.e., the first red (R) signal, green (G) signal, and blue (B) signal, the second red (R') signal, green (G') signal, and blue (B') signal, and the third red (R") signal, green (G") signal, and blue (B") signal.

Note that FIG. 5 illustrates, for simplicity's sake, the case of representing the colors by red (R), green (G), and blue (B) for the information related to the color components included in an input frame signal. However, such information may be represented by another standardized system such as the YIQ color system used for analog television broadcasting and the XYZ (Yxy) color system specified by the International Commission on Illumination (CIE).

The color component signal converted by the color conversion unit 1091 is output to the latch 1092 provided for each color and is thereby temporarily retained.

Figure 14:
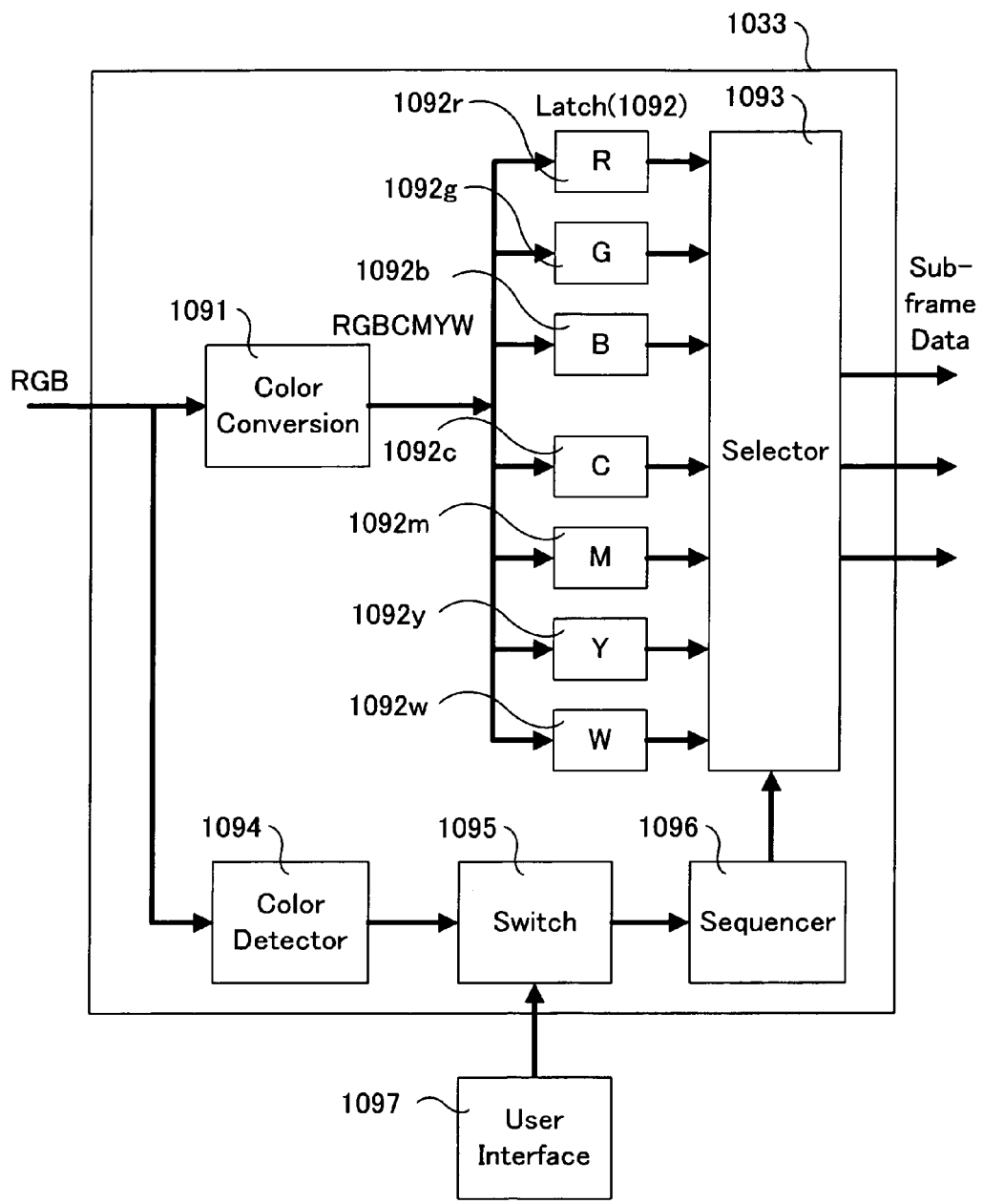
FIG. 14 is a block diagram showing a circuit configuration of a frame interpolation unit according to a preferred embodiment of the present invention.
Figure 15:
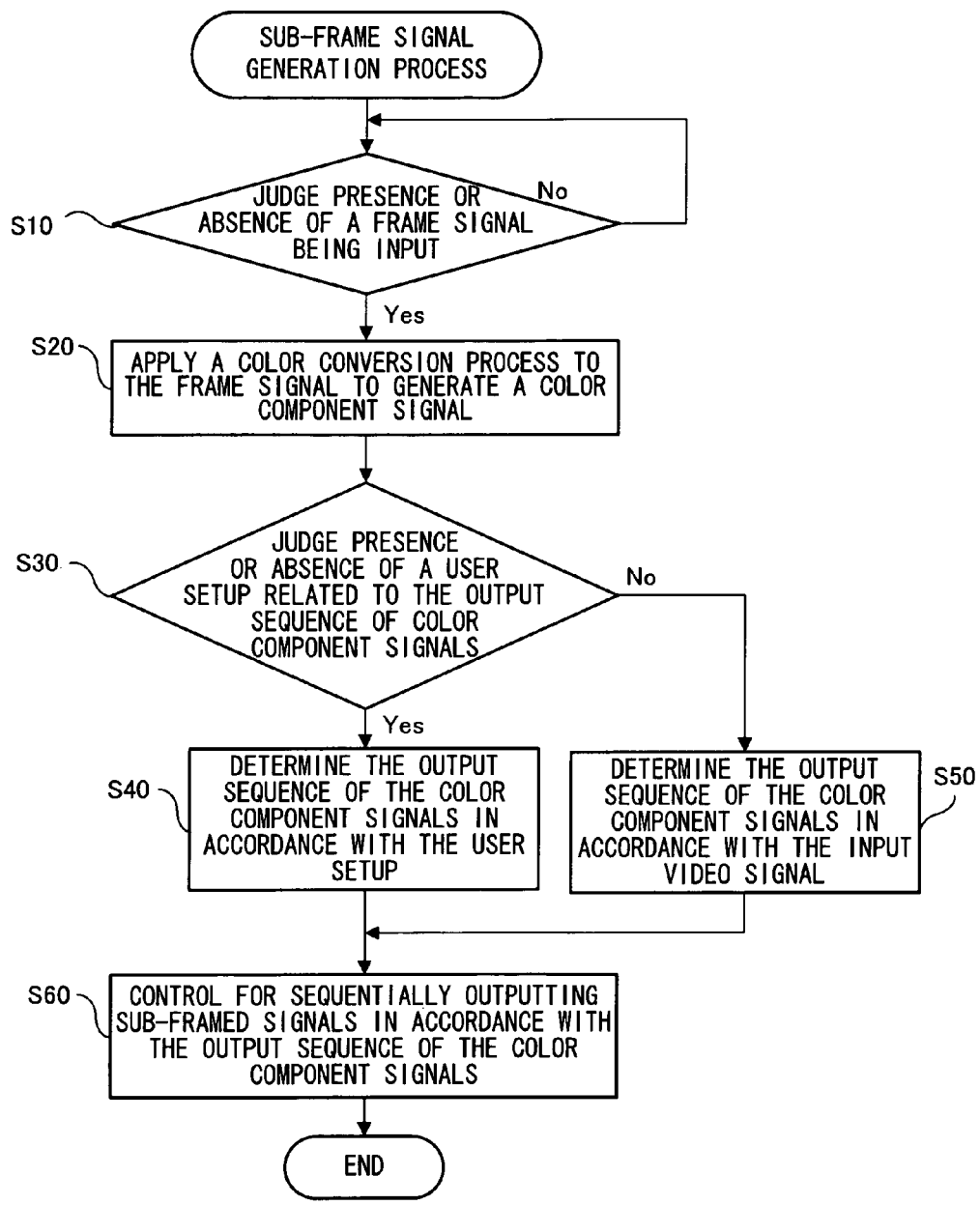
FIG. 15 is a flowchart for showing the processing steps at the frame interpolation unit according to a preferred embodiment of the present invention.

The sequencer 1096 gives instruction to the selector 1093 for the color to be output in the order of a prescribed sequence. The selector 1093 outputs the color component signals from the latch 1092 corresponding to the instructed color in sequence in the order of the instructed sequence, thereby outputting the sub-framed video signal. The present embodiment may also be configured as shown in FIG. 14. Referring to FIG. 14, the frame interpolation unit 1033 comprises the color conversion unit 1091, latch 1092, selector 1093, a color detection unit 1094, a switch 1095, and a sequencer 1096. Meanwhile, FIG. 15 is a flow chart illustrating the process related to the generation of a sub-framed video signal performed at the frame interpolation unit 1033.

Figure 6:
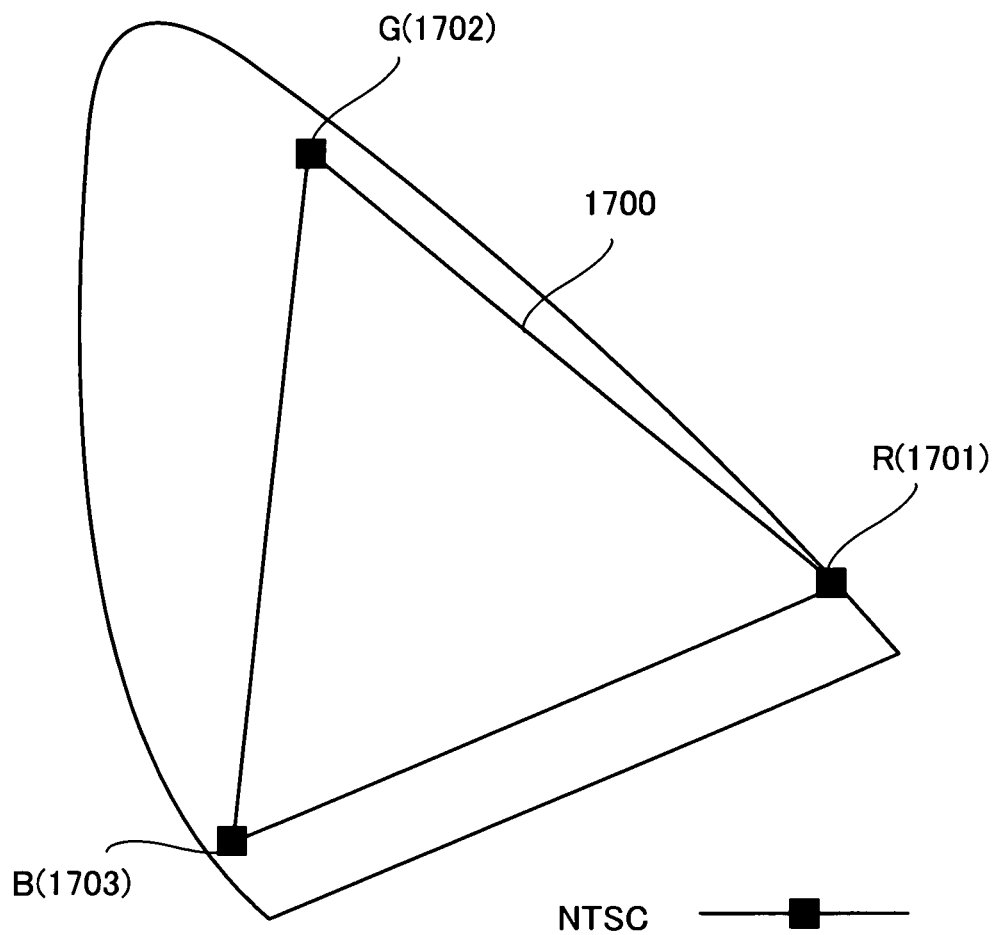
FIG. 6 shows the distribution on a chromaticity diagram of the respective colors R, G, and B specified by the National Television Standards Committee (NTSC).

FIG. 6 is a diagram showing a chromaticity diagram. The XYZ color system expressed by the chromaticity diagram is explained as follows.

The XYZ color system, based on the principle of an additive color mixture of the three primary colors of light (i.e., red (R), green (G), and blue (B)), is a color system specified by the CIE on the basis of the research on the relationship between the normal color sense and the color stimulus of a human being.

According to the XYZ color system, natural colors are expressed with three stimulus values X, Y, and Z, which are "three primary colors in terms of a color representation." This color system is numerically expressed on the basis of research on a mechanical color measurement, color representation, and the wavelength-sensitivity characteristic of the human eye. Note that "Y" represents brightness. "x y," and "z" are produced by converting three stimulus values X, Y, and Z into dimensionless values, and they are in the relationship of x+y+ z=1. In this relationship, when any two values of x, y, and z are determined, the remaining value is determined, and, accordingly, FIG. 6 shows a chromaticity diagram produced by representing all colors in two dimensions by plotting "x" in the horizontal axis and "y" in the vertical axis, while "z" is omitted.

Note that the three stimulus values X, Y, and Z and the coordinates x and y on the chromaticity diagram produced by converting the three stimulus values X, Y and Z into dimensionless values are represented by the following expressions 1 and 2.

$$x = \frac{X}{X+Y+Z}$$ [Expression 1]

$$y = \frac{Y}{X+Y+Z}$$ [Expression 2]

The apexes of the triangle 1700 indicated in the chromaticity diagram shown in FIG. 6 respectively represent the coordinates of the three primary colors of light defined by the so-called NTSC, showing that a color defined inside of the triangle 1700 can be expressed with the three primary colors. The respective coordinates (x, y) of the three primary colors are defined as the coordinate 1701 (0.67, 0.33) for red (R), the coordinate 1702 (0.21, 0.71) for green (G), and the coordinate 1703 (0.14, 0.08) for blue (B).

The three stimulus values X, Y, and Z can also be obtained from the respective coordinates (x, y) of three primary colors by calculating the brightness Y from the relationship of the above expressions 1 and 2.

Note that NTSC is the standard for the analog television system established by American National Television Standard Committee (NTSC), informally referred as "NTSC", which is the abbreviation for the aforementioned committee. This also functions as a standard for video devices and video game software as an extension from the analog television system.

Figure 7:
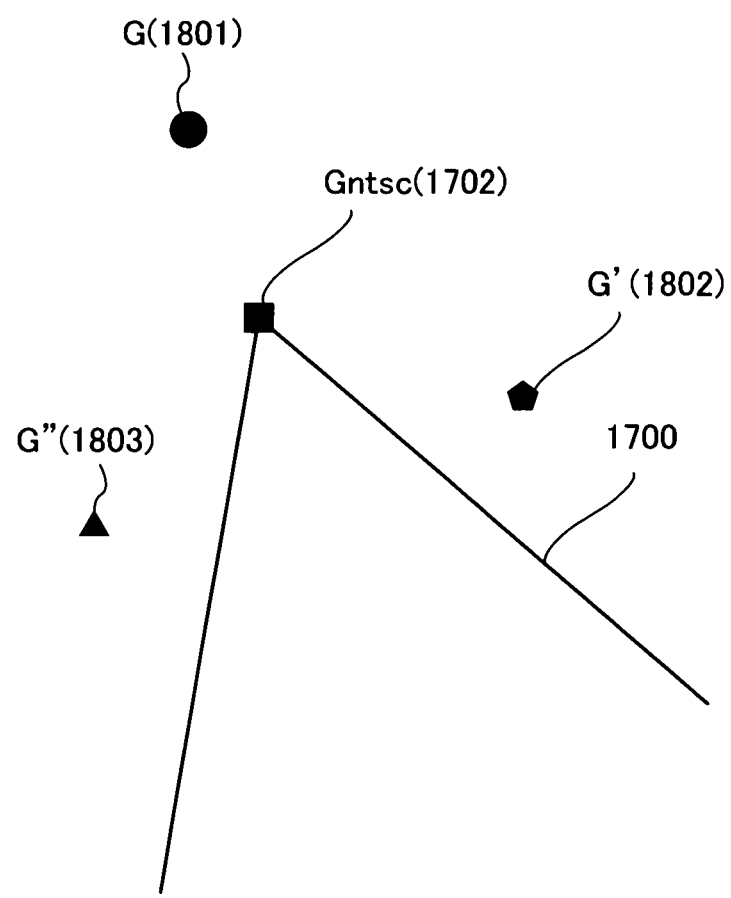
FIG. 7 is a diagram for illustrating a concept of a color conversion in an image signal processing unit according to a preferred embodiment of the present invention.

FIG. 7 is a conceptual diagram illustrating the concept of a color conversion according to the present embodiment, showing an enlargement of the vicinity of the apex of the green (G) signal 1702 of FIG. 6.

The coordinate 1801 indicates the coordinate of the green (G) light beam emitted from the laser light source on the video display apparatus 1001 in the chromaticity diagram. As shown in FIG. 7, the coordinate 1801 of the green (G) light beam emitted from the laser light source is shifted from the coordinate 1702 of green (G) defined by the NTSC, indicating that the green (G) emitted from the laser light source is different from the green (G) in terms of the definition of NTSC.

As illustrated in FIG. 7, the present embodiment is configured such that, if the color of a light beam emitted from the laser light source of the video display system 1001 is different from the desired color in a color coordinate due to a cause, such as an individual difference in the components and the secular change thereof, the setup of a color component signal of an individual color, which is pre-converted in the color conversion unit 1091, is adjusted by means of the following method, and thereby it is possible to attain the desired color representation in a video display.

The following is a description of the process using the green (G) laser light source. Note that the coordinates 1802 and 1803 are coordinates of the colors used for correcting the green (G) emitted from the laser light source to the green (G) defined by the NTSC, and are called correction colors.

[Step 1]:
The color-coordinate 1801 of the green light beam emitted from the laser light source of the video display system 1001 is measured.

[Step 2]:
If the coordinate 1801 measured in step 1 is different from the coordinate of the desired green, the coordinates 1802 and 1803 are calculated of two correction colors with which a green color indicated by the desired coordinate 1702 can be reproduced by mixing the green indicated by the measured coordinate 1801.

For example, assuming a case in which the colors represented by the coordinates 1801, 1802, and 1803 are emitted under the same condition (e.g., the emission period and emission light intensity), the setup may be made so that the average of the above described three coordinates matches the desired coordinate 1702.

Note that there are an innumerable number of combinations between the coordinates 1802 and 1803 of the correction colors satisfying the above described necessary condition, wherein a triangle with the coordinates 1801, 1802, and 1803 as the apexes can be approximated, for example, by an equilateral triangle enclosing the desired coordinate 1702.

[Step 3]:
The emission condition of each color laser light source for generating the correction colors of the coordinates 1802 and 1803 which are determined in step 2 is calculated with expression 3.

In expression 3, however, X, Y, and Z represent the desired three color stimulus values and the three stimulus values of the colors represented by the coordinates 1802 and 1803, respectively.

Meanwhile, a 3 by 3 coefficient matrix constituted by m11 through m33 is a matrix determined by the light source and optical system.

Furthermore, "Pr" "Pg," and "Pb" are the respective emission light intensities of the red (R), green (G) and blue (B) light sources, which are the respective intensities which are required to reproduce the desired colors represented by the three-stimulus values X, Y, and Z.

$$\begin{bmatrix} Pr \\ Pg \\ Pb \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} X \\ Y \\ Z \end{bmatrix}$$ [Expression 3]

Then, the setup of the color component signal converted at the color conversion unit 1091 is adjusted on the basis of the calculation result of the expression 3. More specifically, the color component signal of the second green (G') corresponds to the correction color of the coordinate 1802, and the adjustment is made in such a manner that the red (R), green (G), and blue (B) light sources respectively output, in response to the present color component signal, the emission light intensities calculated with expression 3. Further, the color component signal of the third green (G") signal corresponds to the correction color of the coordinate 1803, and the adjustment is such that the red (R), green (G), and blue (B) light sources output the emission light intensities calculated with expression 3.

As such, carrying out steps 1 through 3 for the red (R), green (G), and blue (B) light sources makes it possible to generate the correction color for each color emitted from the laser light source (i.e., the colors represented by the coordinates 1802 and 1803 in the case of green).

Furthermore, a mixture of the colors emitted from the laser light source with the correction color for the present color makes it possible to reproduce the color on the desired color-coordinate—for example, any one of the primary colors defined by the NTSC.

More specifically, the present embodiment illustrates the process of reproducing a desired color (represented by the coordinate 1702) using a color emitted from the laser light source (represented by the coordinate 1801), and using two-color correction colors (represented by the coordinates 1802 and 1803) which are generated by the red (R), green (G), and blue (B) laser light sources. Such a method is arbitrary, however.

Other methods may include a direct reproduction of a desired color using correction colors themselves generated by the laser light sources of the three colors red (R), green (G), and blue (B).

Furthermore, a desired color may be reproduced by a combination of two correction colors.

Furthermore, a desired color may be reproduced by combining a color emitted from the laser light source with one correction color.

More specifically, the video display system 1001 may be configured to add a light source sensor to the light source optical system 1005 and output the measurement result of the optical sensor to the display processing unit 1006 so as to enable the video display system 1001 to automatically carry out the above described steps 1 through 3. Such a configuration makes it possible to correct, in a timely manner, the difference between a color output from the laser light source and the desired color, the difference having been due to causes such as the individual difference of a component and the secular deterioration thereof.

Figure 8:
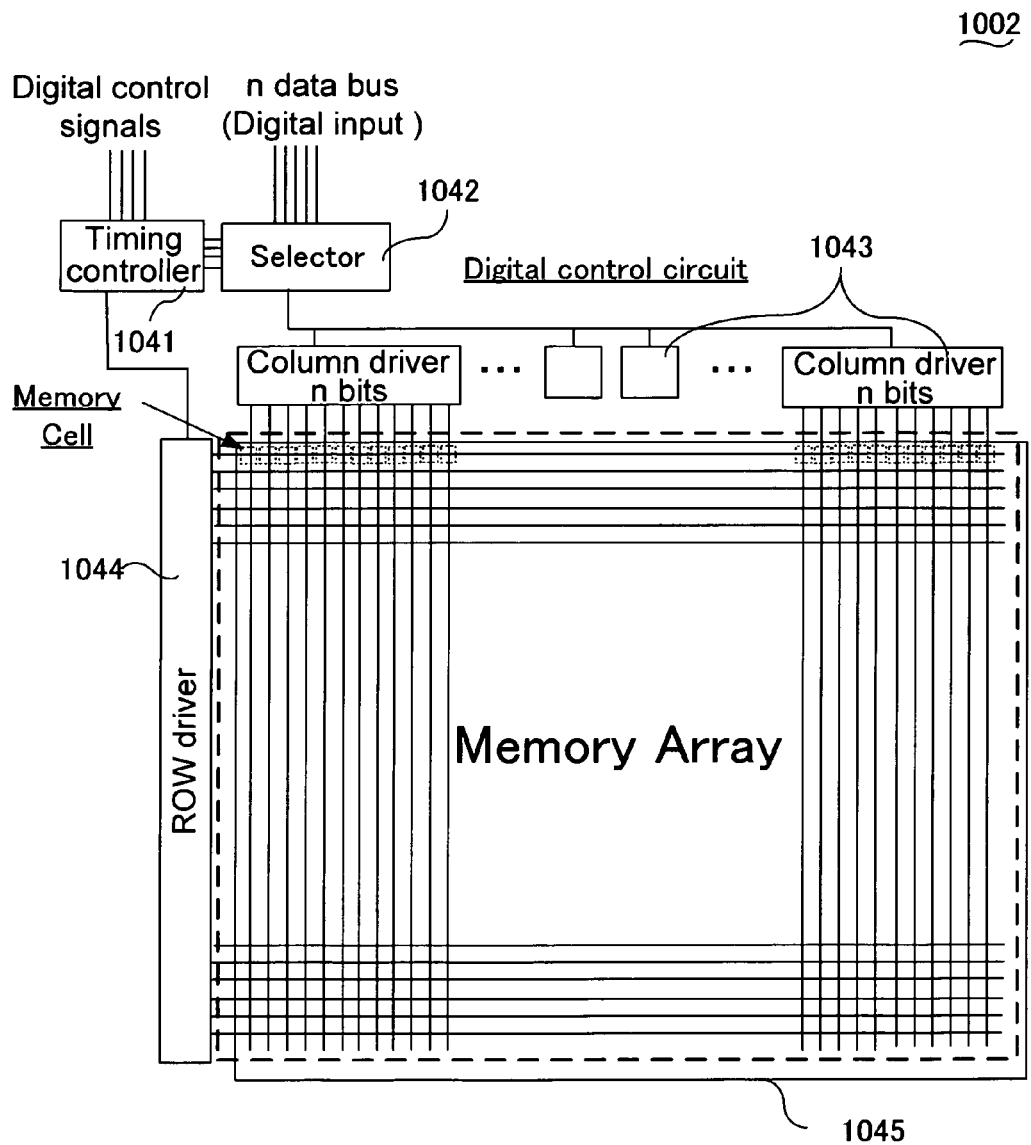
FIG. 8 is a diagram showing the configuration of a spatial light modulator (SLM), in further detail, according to a preferred embodiment of the present invention.

FIG. 8 is a diagram showing the configuration of the SLM 1002 in further detail.

Note that FIG. 8 shows the latch circuit 1042 (shown in FIG. 4) as a selector. Likewise, it shows the Column driver 1043 as a plurality of Column drivers. Additionally, it shows the timing signal input into the timing controller 1041 as digital control signals. Furthermore, timing signals input into the above described timing controller 1041 are shown as digital control signals. Also, the transmission line for the video data input into the above described latch circuit 1042 is shown as "n data bus". Additionally, the individual pixel element includes a memory cell, as described later in detail, and therefore the pixel element array 1045 is also defined as including a memory array in which a plurality of memory cells is arrayed.

As shown in FIG. 8, a plurality of pixel elements is placed in a grid pattern at positions where individual bit lines extending vertically from the respective Column driver 1043 and individual word lines extending horizontally from the Row driver 1044 cross one another in the pixel element array 1045.

Figure 9:
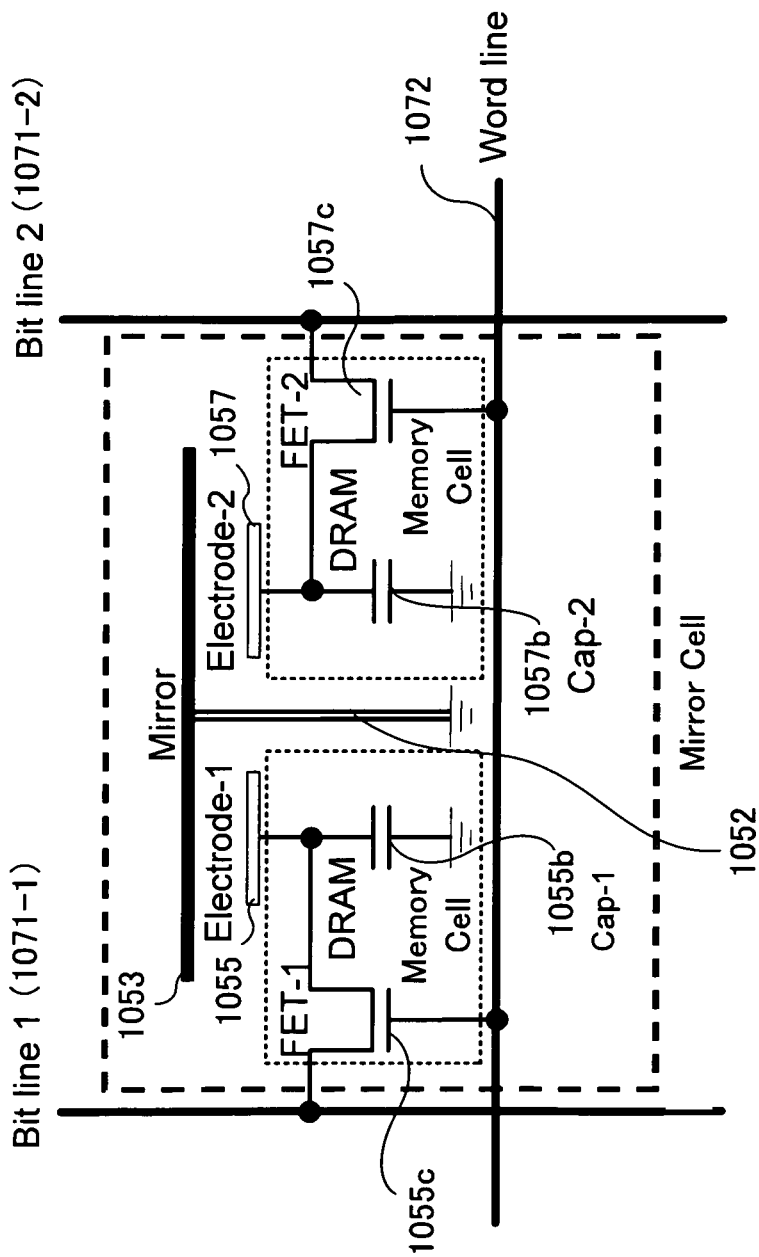
FIG. 9 is a diagram showing an example circuit configuration of an individual pixel element according to a preferred embodiment of the present invention.

FIG. 9 is a diagram showing an example circuit configuration of an individual pixel element.

As shown in FIG. 9, an individual pixel element comprises a mirror 1053 freely deflectable and supported by a substrate (not shown in a drawing) by way of an elastic hinge 1052. An OFF electrode 1055 and an ON electrode 1057 are placed symmetrically across the elastic hinge 1052 on the substrate.

An OFF capacitor 1055*b* is connected to the OFF electrode 1055, and the OFF capacitor 1055*b* is connected to a bit line 1071-1 and a word line 1072 by way of a gate transistor 1055*c*. Here, the OFF capacitor 1055*b* and gate transistor 1055*c* constitute a DRAM-structured memory cell.

Furthermore, an ON capacitor 1057*b* is connected to the ON electrode 1057 and the ON capacitor 1057*b* is connected to a bit line 1071-2 and a word line 1072 by way of a gate transistor 1057*c*. Here, the ON capacitor 1057*b* and gate, transistor 1057*c* constitute a DRAM-structured memory cell.

The opening and closing of the gate transistor 1055*c* and gate transistor 1057*c* are controlled through the word line 1072. That is, a single horizontal row of the pixel elements lined up with an arbitrary word line 1072 are simultaneously selected, and the charging and discharging of capacitance to and from the OFF capacitor 1055*b* and ON capacitor 1057*b* can be controlled through the bit lines 1071-1 and 1071-2.

In a state in which only the OFF capacitor 1055*b* is electrically charged, a predetermined electric potential (simply noted as "potential" hereinafter) is applied to the OFF electrode 1055. Coulomb force is generated between the OFF electrode 1055 and mirror 1053 to attract the mirror 1053 to tilt to a predetermined position on the side on which the OFF electrode 1055 is placed. This operation causes the incident light incident to the mirror 1053 to be reflected to the light path of an OFF position that is shifted from the optical axis of the projection optical system 1004. The state of the mirror 1053 in this event is called an OFF state.

In a state in which only the ON capacitor 1057*b* is electrically charged, a predetermined potential is applied to the ON electrode 1057. Coulomb force is generated between the ON electrode 1057 and mirror 1053 so as to attract the mirror 1053 to tilt to a predetermined position on the side on which the ON electrode 1057 is placed. This operation causes the incident light incident to the mirror 1053 to be reflected to the light path of an ON position matching the optical axis of the projection optical system 1004. The state of the mirror 1053 in this event is called an ON state.

Further, stopping the application of a voltage to the OFF electrode 1055 (or the ON electrode 1057), when the mirror 1053 is in the OFF state or ON state, eliminates the coulomb force generated between the mirror 1053 and OFF electrode 1055 (or the ON electrode 1057), causing the mirror 1053 to perform a free oscillation in accordance with the characteristic of the elastic hinge 1052. With this operation, the incident light incident to the mirror 1053 is reflected to a light path between the light path at the OFF position, which is shifted from the optical axis of the projection optical system 1004 and the light path at the ON position lined up with the optical axis of the projection optical system 1004. The state of the mirror 1053 in this event is called an oscillation state.

More specifically, the total volume of light (also noted as "light volume" hereinafter) reflected toward the projection optical system 1004 by the mirror performing the free oscillation is always smaller than the light volume when the mirror 1053 is in the ON state and always larger than the light volume when the mirror 1053 is in the OFF state. That is, it is possible to set the light volume between the light volumes of the ON state and OFF state.

Therefore, controlling the charging and discharging electric charge to and from the OFF capacitor 1055*b* and ON capacitor 1057*b* through the word line 1072 and bit lines 1071-1 and 1071-2 makes it possible to individually control the ON state, OFF state, and oscillation of the mirror 1063 for each pixel element.

Figure 10A:
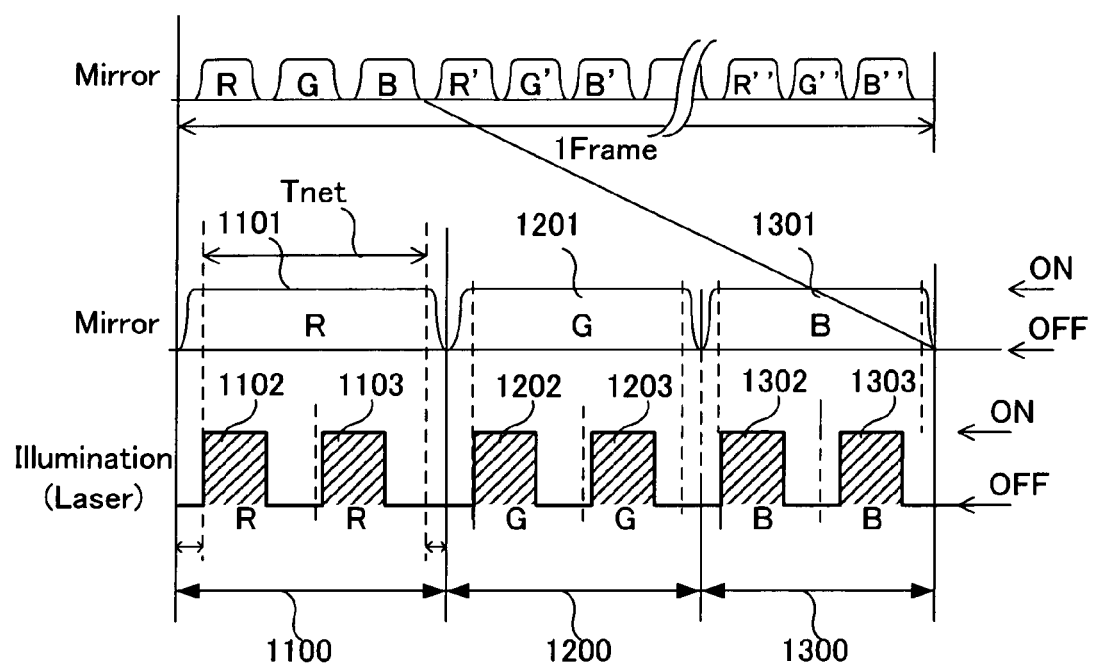
FIG. 10A is a diagram showing emission patterns of variable light sources according to a preferred embodiment of the present invention.
Figure 10B:
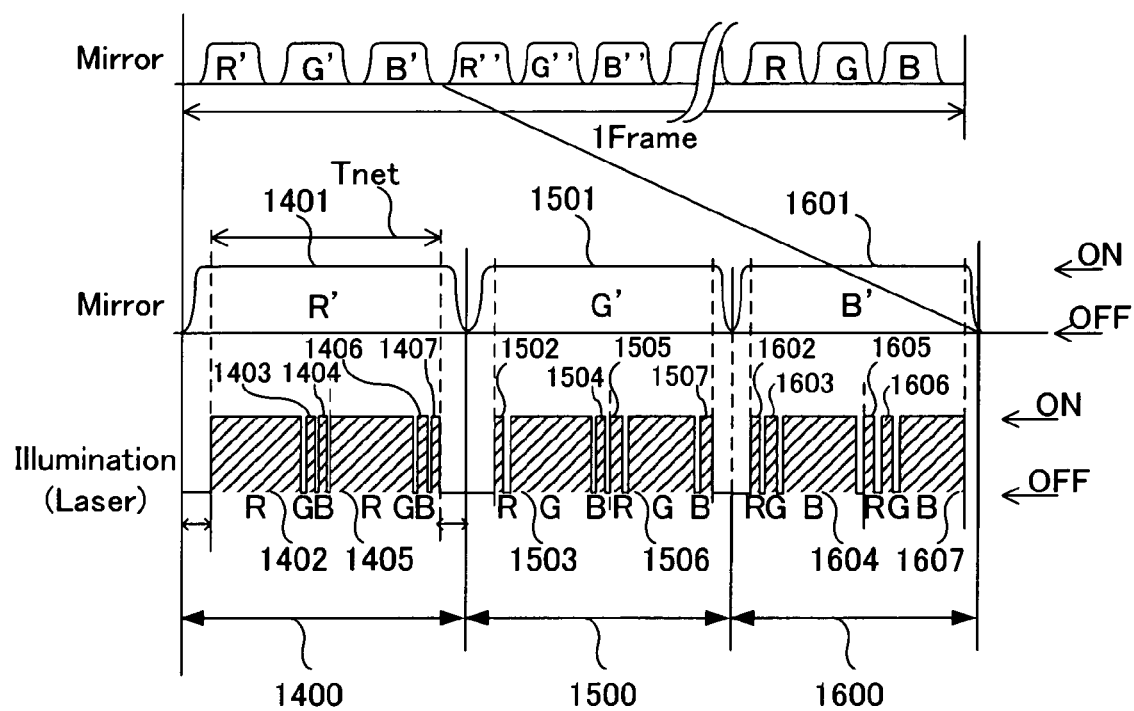
FIG. 10B is a diagram showing another emission pattern of variable light sources according to a preferred embodiment of the present invention.

FIGS. 10A and 10B are diagrams showing example emission of the variable light sources (i.e., the variable light source 1013) according to a preferred embodiment of the present invention.

The following is a description of an emission control for the laser light source (i.e., the variable light source 1013) performed by the light source controller 1019. The assumption here is that the mirror 1053 is always in the ON state except during a transition state from the OFF state to an ON state and vice versa, for the sake of simplicity of description.

FIG. 10A illustrates an emission control for laser light sources when the first red (R), green (G), and blue (B) signals are sequentially displayed within the frame interpolation unit 1033.

The sub-frame is constituted by three display periods 1100, 1200, and 1300 for displaying the first red (R), green (G), and blue (B) signals, respectively, as shown in FIG. 10A.

The light source controller 1019 causes the laser light sources corresponding to the colors to be displayed within each display period to emit only the respective volumes of light, through the adjustment of the emission period, corresponding to the gray scale determined within the frame interpolation unit 1033 on the basis of an instruction from the sequencer 1035.

Note that a volume of light corresponding to a determined gray scale is emitted through adjustment of the emission period of the laser light sources of the respective colors in the present embodiment; such a configuration is arbitrary. The volume of light corresponding to the determined gray scale may be emitted by adjusting the intensities of emission light of the respective laser light sources.

Furthermore, the present embodiment illustrates the case of dividing the emission into two time periods to provide the volume of light corresponding to the determined gray scale. For example, in the case of the display period 1100, the emission periods 1102 and 1103 are applied. Such an operation is arbitrary so that the emission period may be reduced to one time period or increased to three time periods or more.

Furthermore, the above described emission periods are all designated to occur within the period (Tnet) of the ON state of the mirror 1053 in order to utilize the volume of light emitted from the laser light source.

FIG. 10B illustrates an emission control for laser light sources when the second red (R'), green (G'), and blue (B') signals are sequentially displayed within the frame interpolation unit 1033.

As in the case of FIG. 10A, the sub-frame is constituted by three display periods 1400, 1500 and 1600 for displaying the second red (R'), green (G'), and blue (B') signals, respectively.

The light source controller 1019 causes the laser light sources of the respective colors to sequentially emit light in a predetermined ratio so as to mix the colors within each display period on the basis of instruction from the sequencer 1035, thereby reproducing the second red (R'), green (G'), and blue (B') signals, respectively, on the basis of an instruction from the sequencer 1035.

For example, in the case of the display period 1400 for displaying the second red (R') signal, first, the red (R) laser light source is made to emit light for a period indicated by the emission period 1402, and then the green (G) and blue (B) laser light sources are made to emit respective lights sequentially for the emission periods 1403 and 1404, respectively, in order to adjust the difference between the color of the light beam from the red (R) laser light source and the desired color. This operation is repeated two times within the display period 1400, and thereby the second red (R') signal, that is, the desired color, is displayed.

More specifically, the predetermined ratio of the periods for emitting the respective color laser lights can be determined by using the emission light intensities Pr, Pg, and Pb which are calculated by the above described expression 3 on the basis of the three stimulus values of the respective colors, i.e., the second red (R'), green (G'), and blue (B') signals. More specifically, with the emission light intensities Pr, Pg, and Pb of the respective color laser lights considered as the ratio of the volume of light of the respective color laser lights to be irradiated, the emission periods of the red (R), green (G), and blue (B) laser light sources within the display period 1400 are designated to be the ratio of the emission light intensities Pr, Pg, and Pb. In this case, the assumption is that the emission light intensities of the respective color laser light sources are set to be the same.

Furthermore, although it is not shown in a drawing, the third red (R"), green (G"), and blue (B") signals can also be displayed in a similar manner to the case of displaying the second red (R'), green (G'), and blue (B') signals.

Note that FIG. 10B illustrates the case of generating the second red (R'), green (G'), and blue (B') signals by adjusting the ratio of the emission periods of the respective laser light sources to adjust the volumes of light emitted from the respective laser light sources; such an operation is arbitrary.

Alternatively, the second red (R'), green (G'), and blue (B') signals may be generated by adjusting the ratio of the emission light intensities of the respective laser light sources so as to adjust the volumes of light emitted from the respective laser light sources.

Furthermore, the second red (R'), green (G'), and blue (B') signals may be generated by adjusting the ratio of the emission periods of the respective laser light sources and the ratio of the emission light intensities of the respective laser light sources so as to adjust the volume of light emitted from the respective laser light sources.

As described above, the use of the video display system 1001 according to the present embodiment makes it possible to correct a change in emitted colors due to the individual difference in the variable light source 1013 and a change in emitted colors due to a secular deterioration of the variable light source included in the video display system 1001.

With this configuration, it is possible to reproduce the colors of a color image, in high fidelity, represented by the input video signal.

The following is a description of an example operation of the image signal processing unit 1017 as an example operation performed in the video display system 1001 according to the present embodiment.

Figure 11:
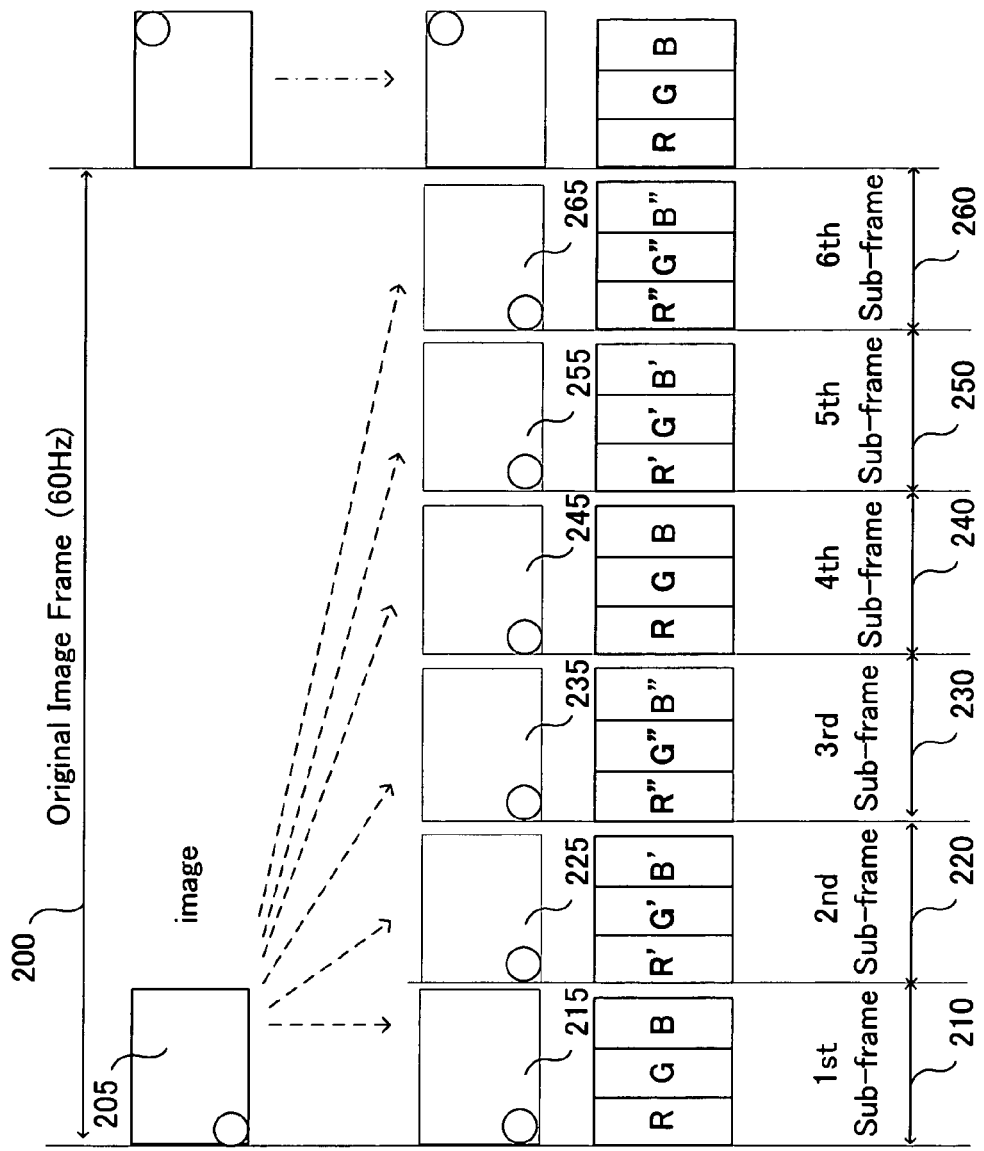
FIG. 11 is a diagram showing an operation of an image signal processing unit according to a preferred embodiment of the present invention.
Figure 12:
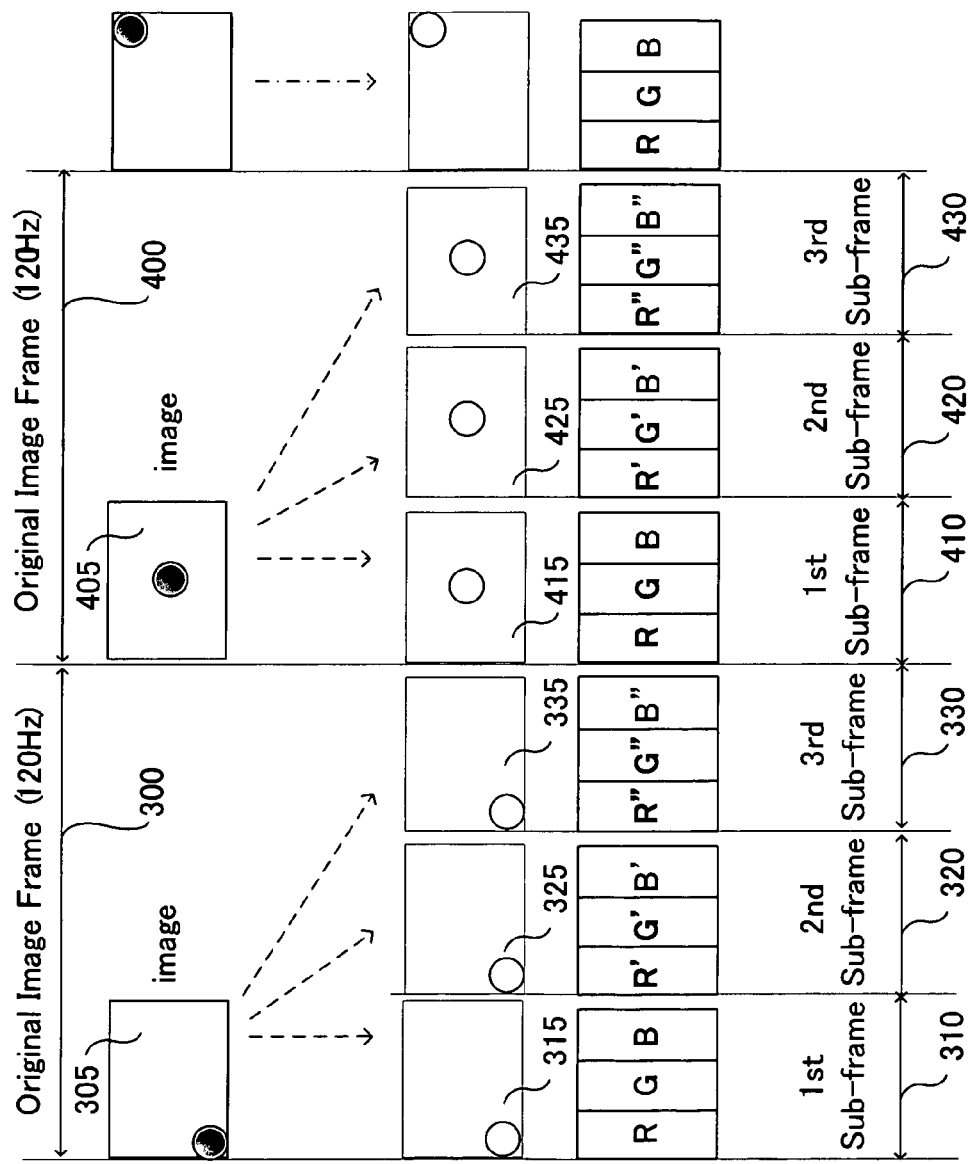
FIG. 12 is a diagram showing another operation of an image signal processing unit according to a preferred embodiment of the present invention.

In FIGS. 11 and 12, "frame signal" on the upper row of the drawing represents a video signal input into the frame interpolation unit 1033, and "sub-frame signal" in the middle row represents a sub-framed video signal output from the frame interpolation unit 1033. "Color output sequence" on the lower row represents the color output sequence of each color component signal within a sub-frame signal. Additionally, in FIGS. 11 and 12, the video image of "frame signal" on the upper row is a video image of the pixel moving from the bottom left to the top right.

More specifically, a frame rate simply represents the generation frequency of a frame or sub-frame in the following description.

FIG. 11 illustrates a case in which the image signal processing unit 1017 generates a sub-frame signal with a 360 Hz frame rate from a frame signal with a 60 Hz frame rate.

The image signal processing unit 1017, first converts the input frame signal into nine color component signals, i.e., the first red (R), green (G), and blue (B) signals, the second red (R'), green (G'), and blue (B') signals, and the third red (R"), green (G"), and blue (B") signals. It then outputs three respective color component signals for each sub-frame to generate a total of six sub-frames.

The present example is configured to generate three kinds of sub-frame signals, that is, a first sub-frame signal (i.e., sub-frames 210 and 240) constituted by the first red (R), green (G), and blue (B) signals; a second sub-frame signal (i.e., sub-frames 220 and 250) constituted by the second red (R'), green (G'), and blue (B') signals; and a third sub-frame signal (i.e., sub-frames 230 and 260) constituted by the third red (R"), green (G"), and blue (B") signals.

Therefore, at minimum, a color image is actually reproduced at a 120 Hz frame rate, that is, the cycle for displaying three kinds of sub-frames. Furthermore, if a color image can be similarly reproduced with the first sub-frame signal constituted by the first red (R), green (G), and blue (B) signals, the second sub-frame signal constituted by the second red (R'), green (G'), and blue (B') signals, and the third sub-frame signal constituted by the third red (R"), green (G"), and blue (B") signals, respectively, a color image is actually reproduced in a nearly 360 Hz cycle.

This configuration reproduces a color image at a higher frame rate than the frame rate of the input frame signal, thereby making it possible to keep image quality from degrading due to a color breakup phenomenon.

Additionally, the first, second and third sub-frame signals occur two times, respectively, within one frame period (i.e., the frame 200 in this case). That is, the aforementioned sub-frame signals occur one time in half a frame (½ frame) so that the first, second, and third red, green, and blue signals are respectively mixed, and, thereby, it is possible to reproduce the desired three primary colors R, G, and B in units of 120 Hz (i.e., ½ frame). This configuration makes it possible to correct a difference in the color of the light beam of an emitted laser light source due to the individual difference in, and a change in the colors of the light beam of the emitted laser light source due to a secular deterioration of, the variable light source 1013 included in the video display system 1001. This thereby enables a high fidelity color reproduction of the input individual video signals.

FIG. 12 illustrates a case in which a frame signal with a 120 Hz frame rate, that is, twice the normal speed, is input.

Here, a sub-frame signal with a 360 Hz frame rate is generated, as in the case of FIG. 11. That is, three sub-frames are generated from each frame.

Furthermore, as in the case of FIG. 11, the image signal processing unit 1017 generates three kinds of sub-frame signals, that is, a first sub-frame signal (i.e., sub-frames 310 and 410) constituted by the first red (R), green (G), and blue (B) signals; a second sub-frame signal (i.e., sub-frames 320 and 420) constituted by the second red (R'), green (G'), and blue (B') signals; and a third sub-frame signal (i.e., sub-frames 330 and 430) constituted by the third red (R"), green (G"), and blue (B") signals.

This configuration makes it possible to respond to an improvement in reproducibility related to the motion of an image due to increasing the frame rate of the input frame signal, while keeping image quality from degrading due to color breakup, as in the case of FIG. 11.

Furthermore, the first, second, and third sub-frame signals occur within each frame period (i.e., frames 300 and 400), thereby mixing the red colors (R, R' and R"), green colors (G, G' and G"), and blue colors (B, B' and B") of the respective sub-frames, making it possible to reproduce the desired three primary colors for each frame.

This configuration makes it possible to correct a difference in the color of the light beam of an emitted laser light source due to the individual difference in, and a change in the colors of the light beam of the emitted laser light source due to a secular deterioration of, the variable light source 1013 included in the video display system 1001. This thereby enables a high fidelity color reproduction of the input individual video signals.

Furthermore, the present example indicates that a video display apparatus according to the present embodiment is capable of responding to a change in the frame rates (i.e., 60 Hz to 120 Hz in this case) of an input frame signal.

The above described operation of the image signal processing unit 1017 shown in FIGS. 11 and 12 is an example of the case of the variable light source 1013 including three color light sources, i.e., red (R), green (G), and blue (B).

Light sources included in a variable light source 1013 are not limited to these three colors. Other colors, such as cyan (C), magenta (M), and yellow (Y), may be included. Also in, such a case, the difference between the color emitted from the respective light sources and the desired colors can be corrected by using other color light sources, as in the case of using three color light sources, i.e., red (R), green (G), and blue (B).

Figure 13:
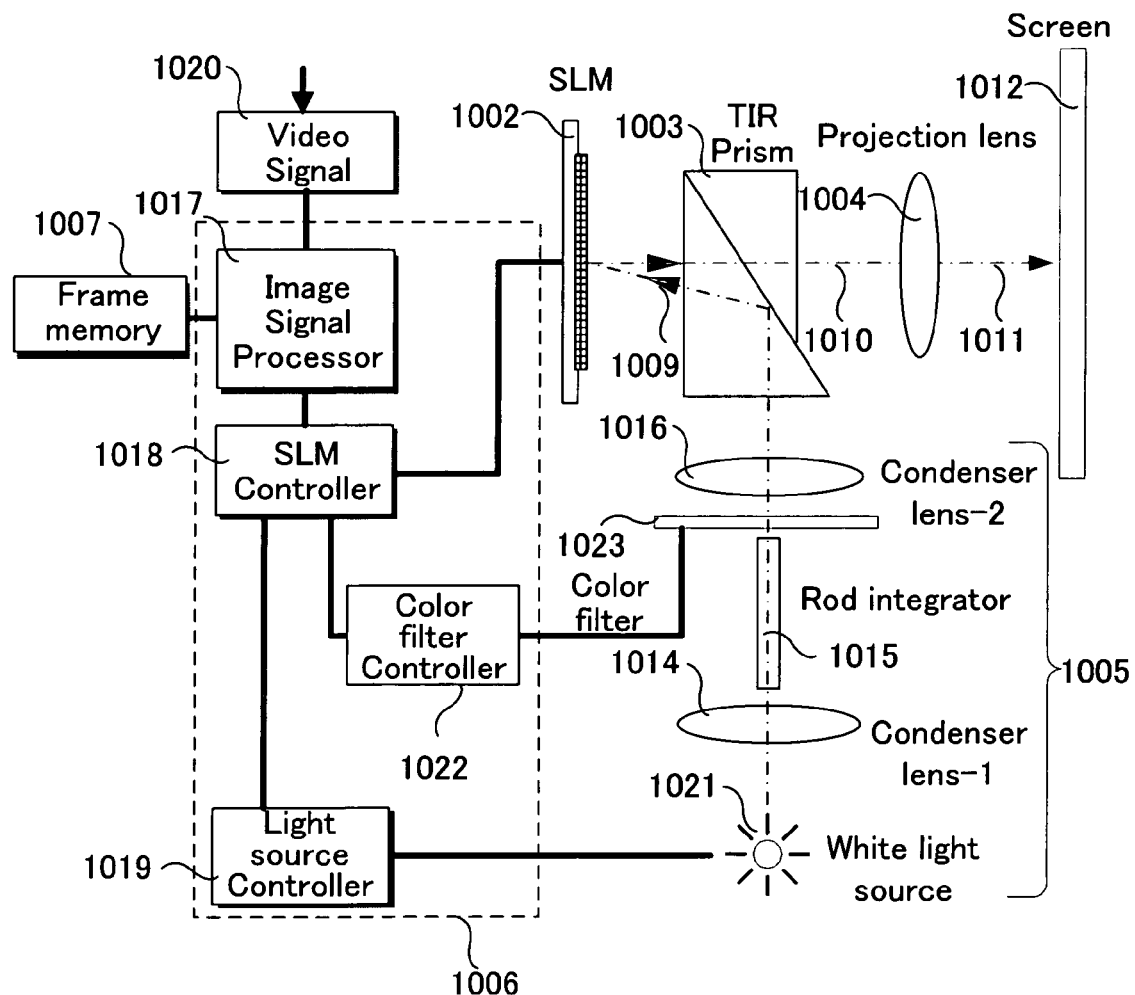
FIG. 13 is a functional block diagram for showing another video display apparatus according to a preferred embodiment of the present invention.

FIG. 13 is a diagram showing another example comprisal of a video display apparatus according to a preferred embodiment of the present invention.

The video display apparatus 2001 shown in FIG. 13 includes a variable light source 1021 constituted by a white light source in place of the variable light source 1013 constituted by a semiconductor light source comprised in the video display apparatus 1001, shown in the already described FIG. 3.

Furthermore, the display processing unit 1006 is additionally equipped with a color filter controller 1022, and the light source optical system 1005 is additionally equipped with a color filter 1023.

The color filter controller 1022 and color filter 1023 are provided for controlling the selection of the wavelength domain (i.e., the color) of a light beam incident to the SLM associated with utilizing the white light source in place of a semiconductor light source, the control being carried out by the light source controller 1019 and semiconductor light source in the configuration of FIG. 3.

Other comprisals are similar to that of FIG. 3, so a duplicate description is not provided here.

The circuit configuration of the video display apparatus 2001 is partially changed from that of the video display apparatus 1001 shown in FIG. 3. There is only a single point of change: transferring the function so as to select the wavelength domain (i.e., the color) of a light beam from the light source controller 1019 (FIG. 3) to the color controller 1022.

The following is describes another preferred embodiment of the present invention, as shown in the already described FIGS. 13 and 15.

Figure 16A:
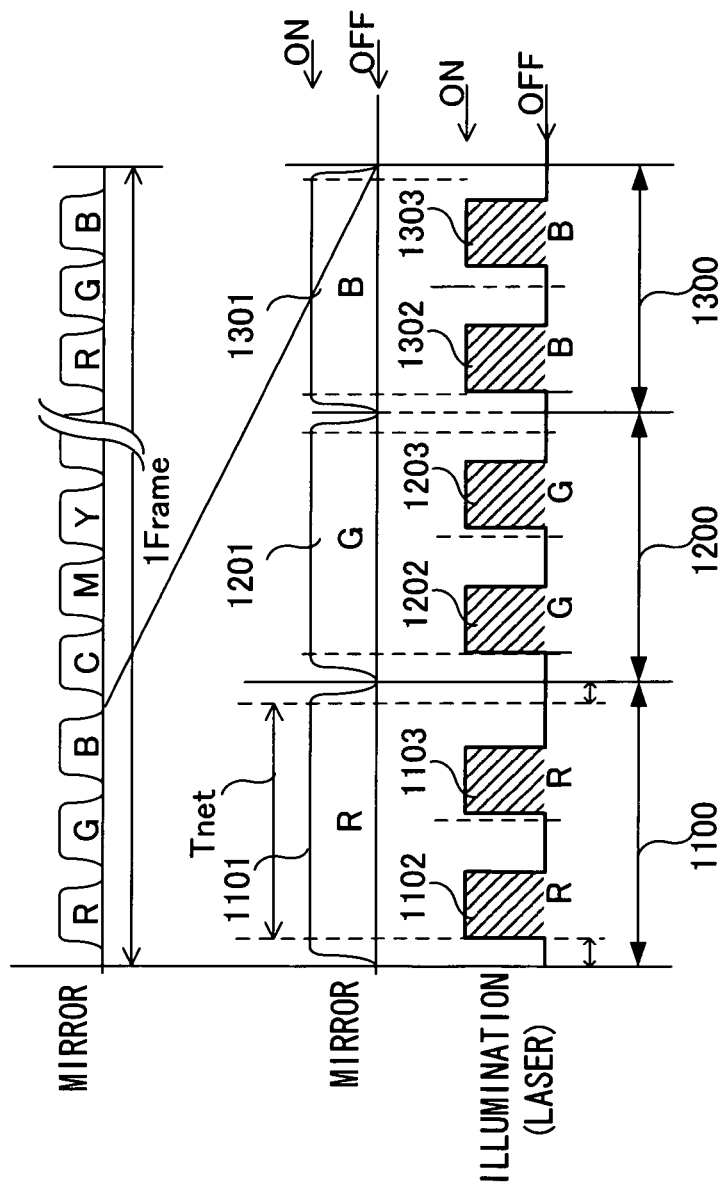
FIG. 16A is a diagram showing an emission pattern of a variable light source according to a preferred embodiment of the present invention.
Figure 16B:
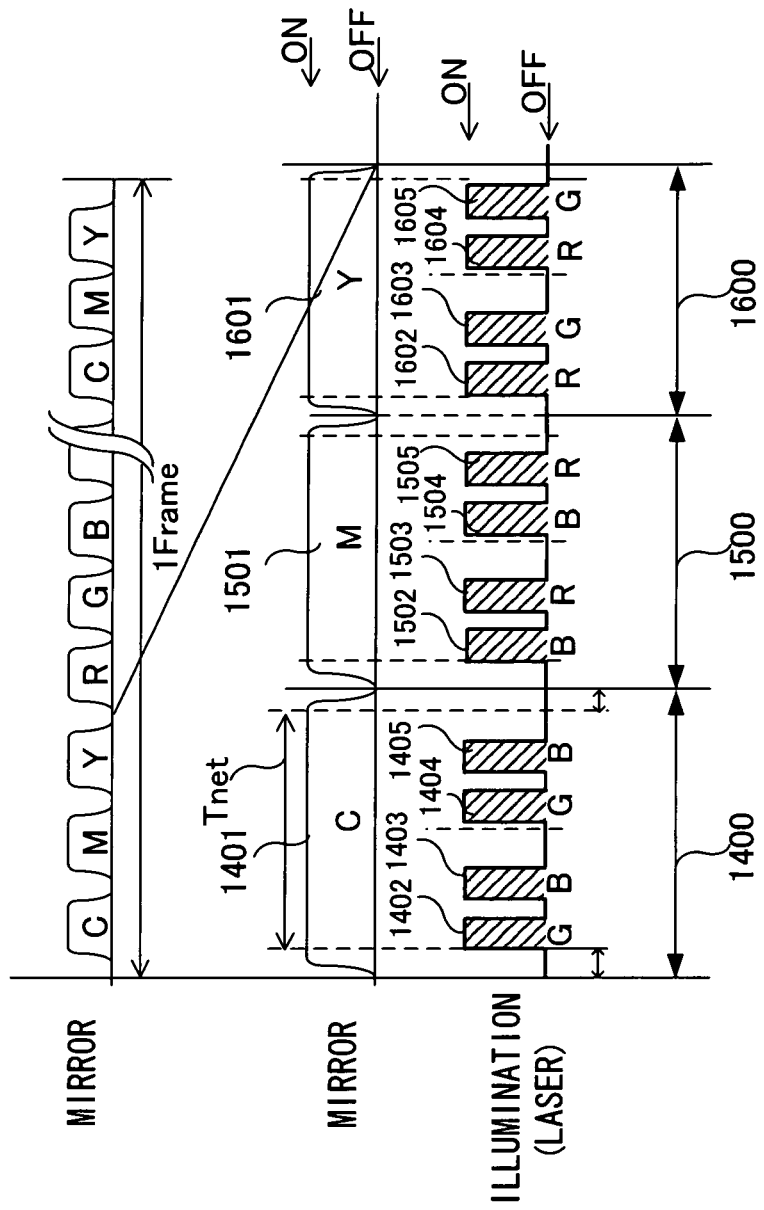
FIG. 16B is a diagram showing another emission pattern of a variable light source according to a preferred embodiment of the present invention.

FIG. 16A shows an example emission control for a variable light source when red (R), green (G), and blue (B) are displayed in sequence within one frame period on the basis of the output sequence of color component signals determined within the frame interpolation unit 1033. FIG. 16B shows an example emission control for a variable light source when cyan (C), magenta (M), and yellow (Y) are displayed in sequence within one frame period on the basis of the output sequence of color component signals determined within the frame interpolation unit 1033.

Figure 17:
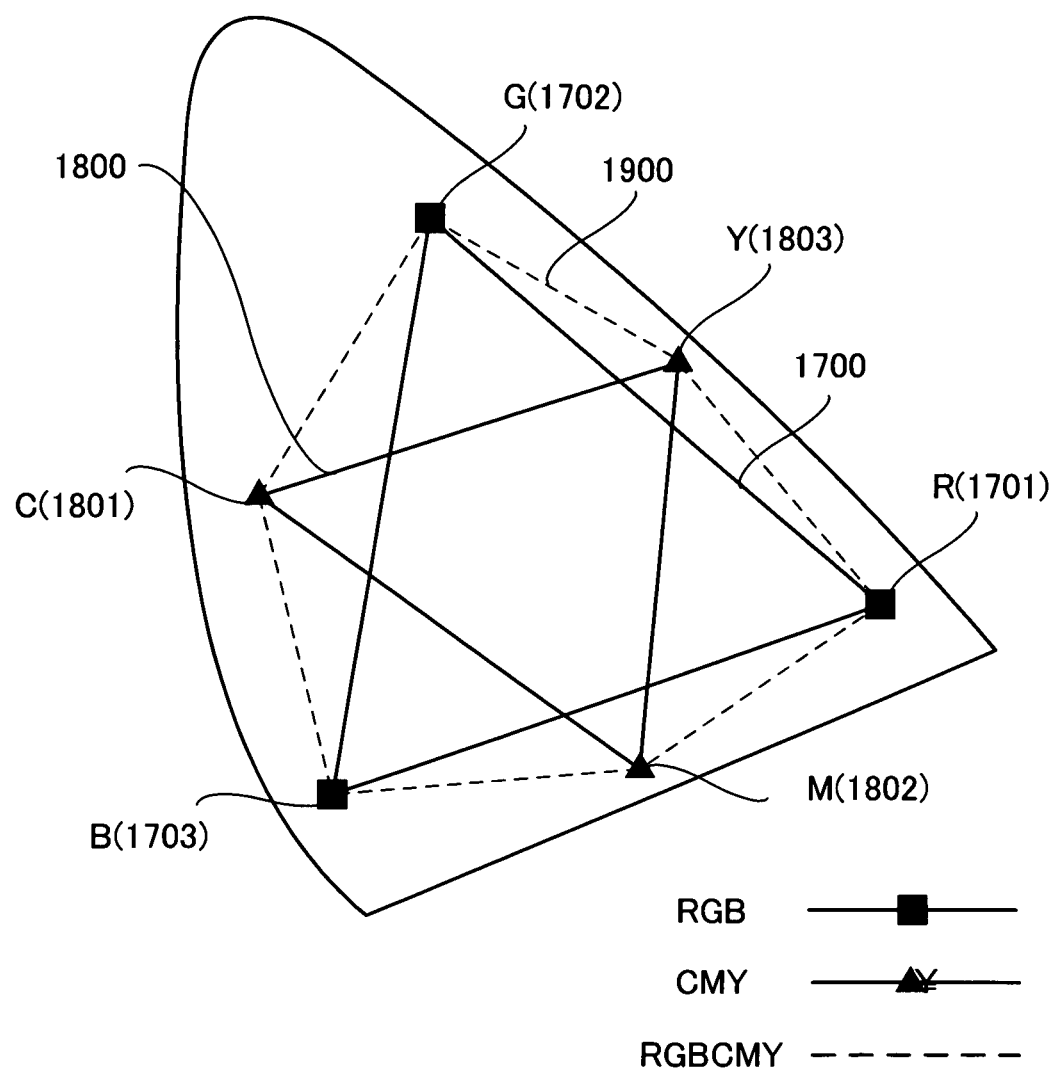
FIG. 17 shows the distribution of the three primary colors R, G, and B and their complementary colors (i.e., cyan (C), magenta (M), and yellow (Y)) on a chromaticity diagram.

FIG. 17 shows that a color image can be adjusted in the color spectrum within the scope of a hexagon 1900 having apexes at the coordinate 1701 of red (R), the coordinate 1702 of green (G), the coordinate 1703 of blue (B), the coordinate 1801 of cyan (C), the coordinate 1802 of magenta (M), and the coordinate 1803 of yellow (Y), on the chromaticity diagram without a need to change the inputted frame signal itself.

Figure 18:
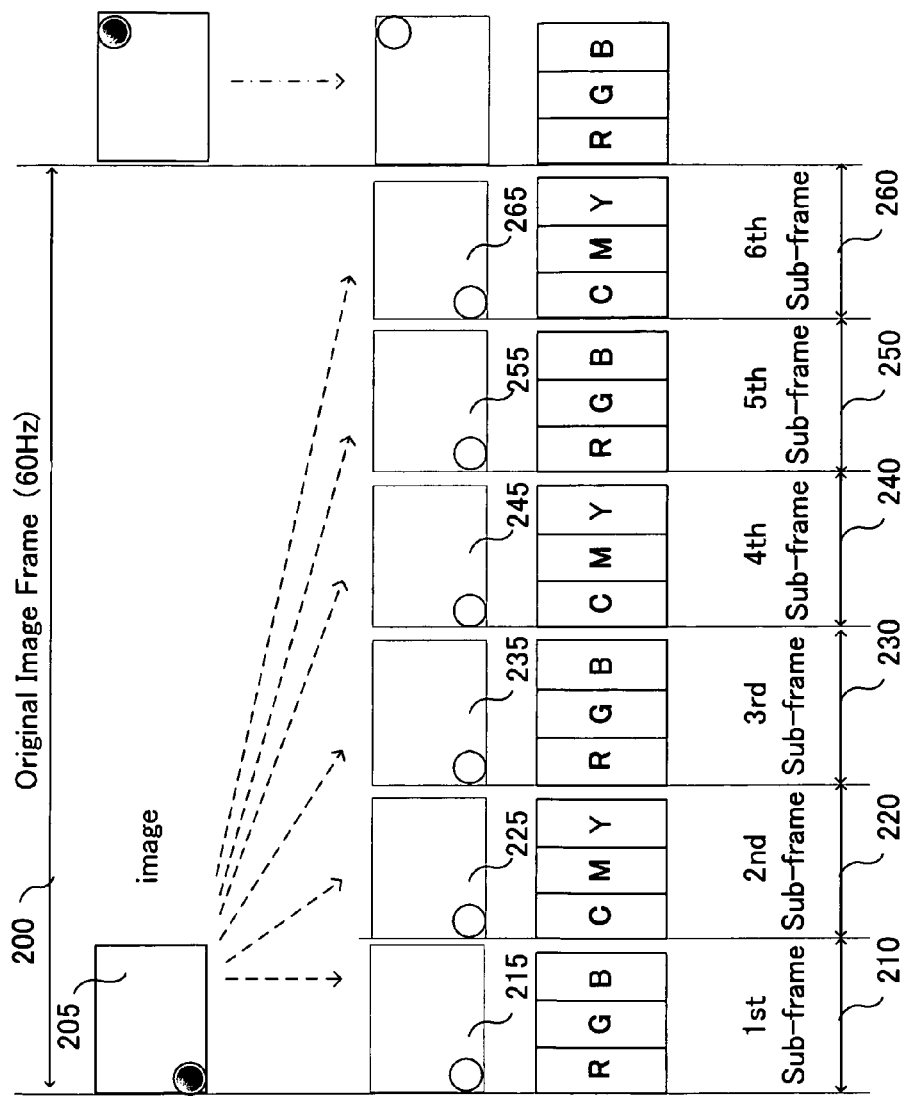
FIG. 18 is a diagram showing an operation process of an image processing unit according to a preferred embodiment of the present invention.

FIG. 18 illustrates a case in which the image signal processing unit 1017 generates sub-frame signals with a 360 Hz frame rate from a frame signal with a 60 Hz frame rate.

Figure 19:
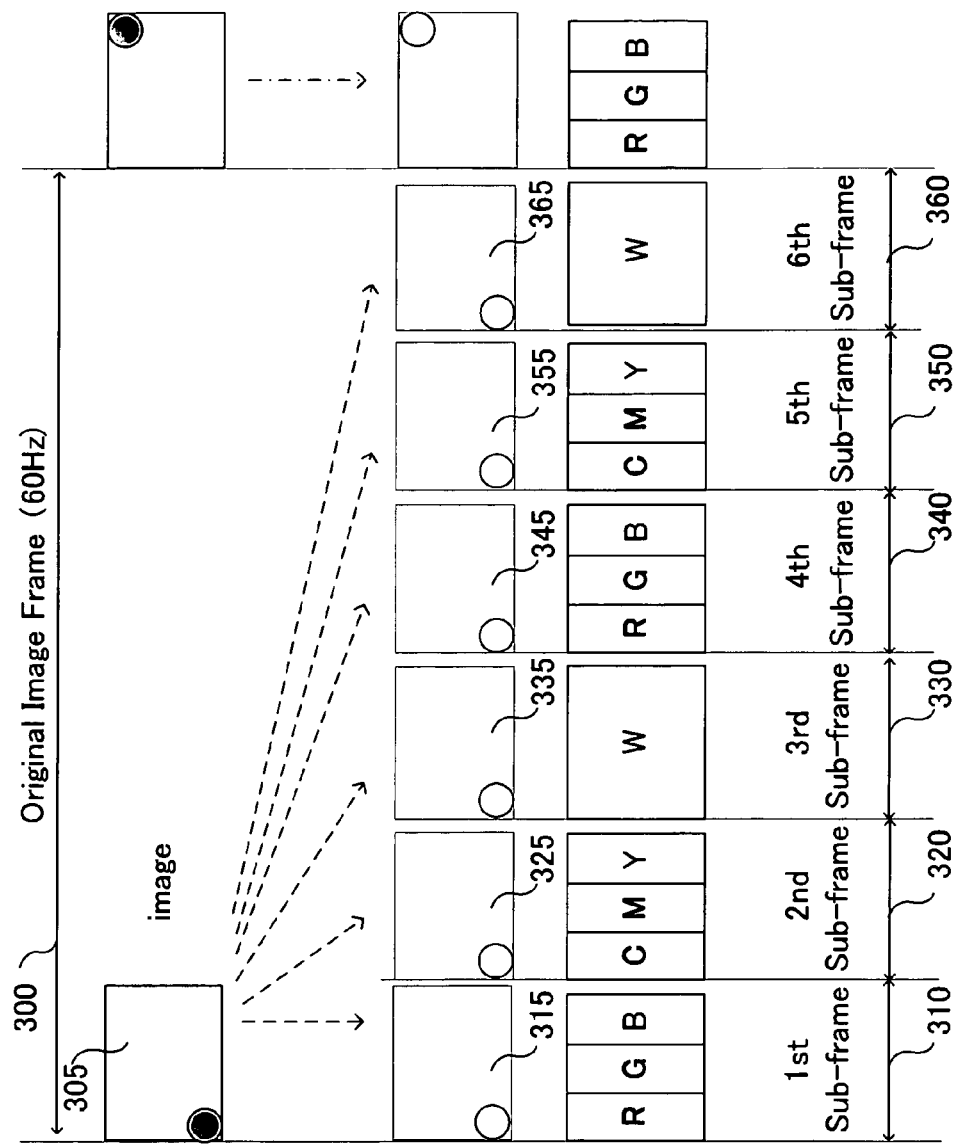
FIG. 19 is a diagram showing another operation process of an image processing unit according to a preferred embodiment of the present invention.

FIG. 19 illustrates a case in which sub-frame signals with a 360 Hz frame rate are generated from a frame signal with a 60 Hz frame rate.

Figure 20:
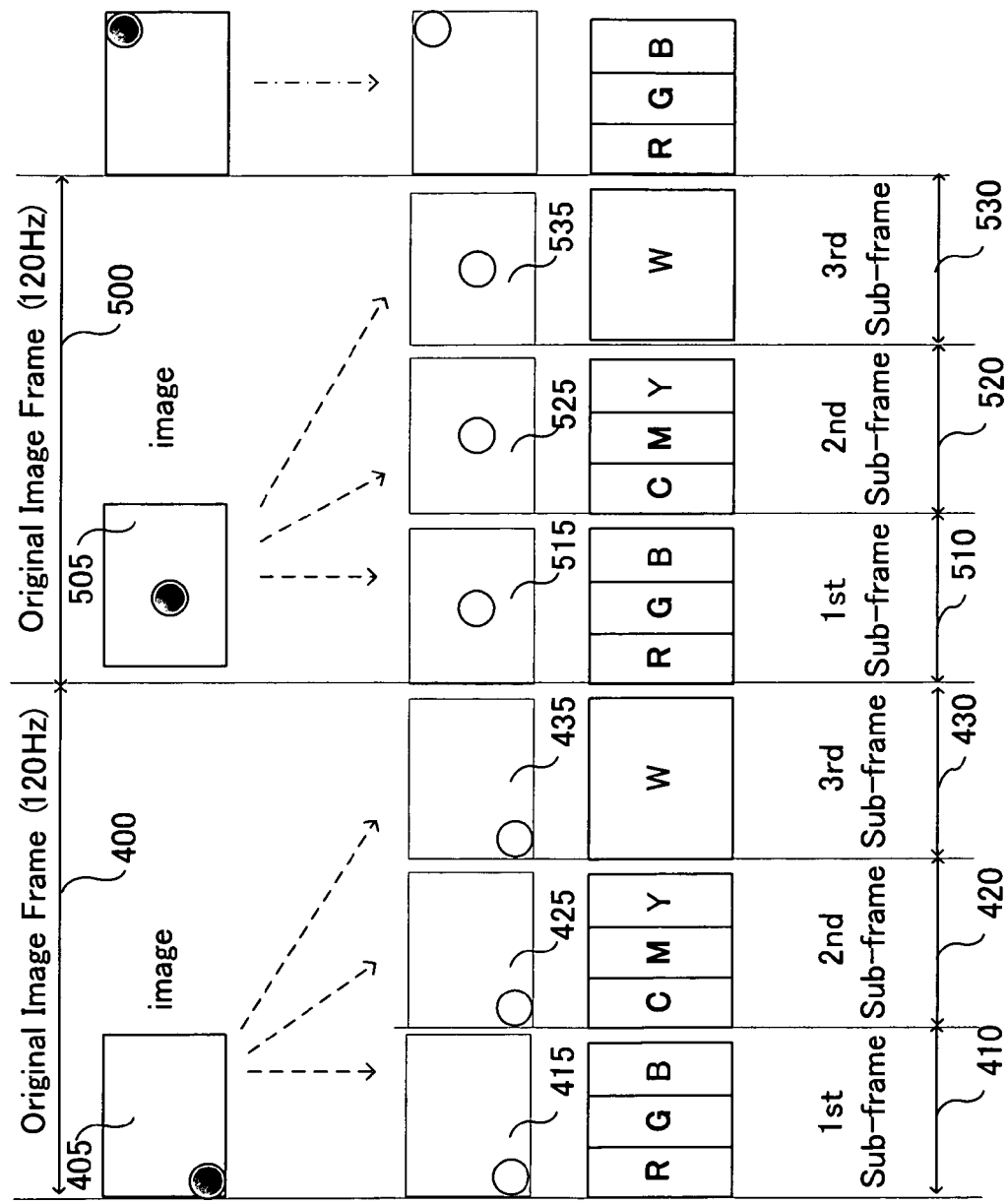
FIG. 20 is a diagram showing a yet another operation process of an image processing unit according to a preferred embodiment of the present invention.

FIG. 20 illustrates a case in which a frame signal with a 120 Hz frame rate (twice the normal frame rate) is input.

Figure 21:
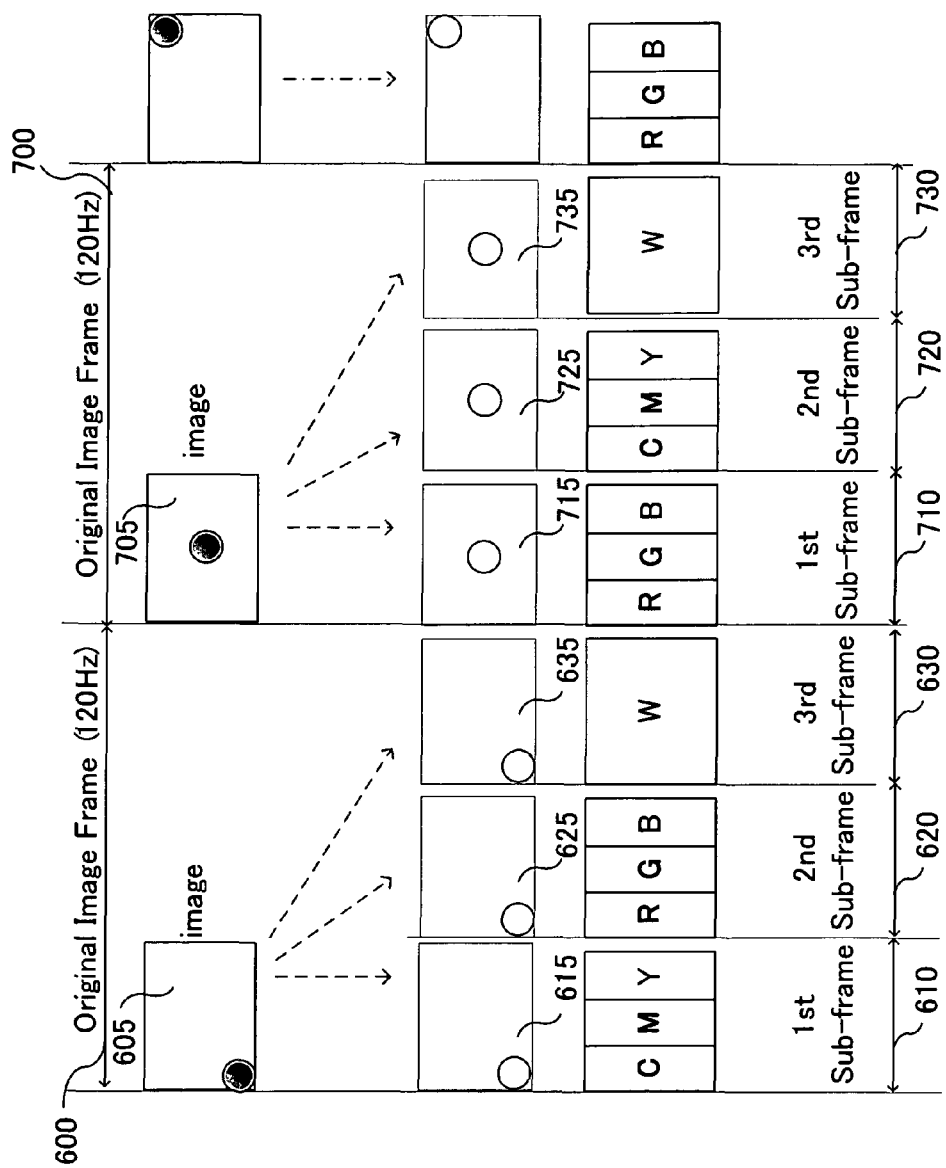
FIG. 21 is a diagram showing a yet another operation process of an image processing unit according to a preferred embodiment of the present invention.

FIG. 21 exemplifies another case in which a frame signal with a 120 Hz frame rate (twice the normal frame rate) is input.

Figure 22:
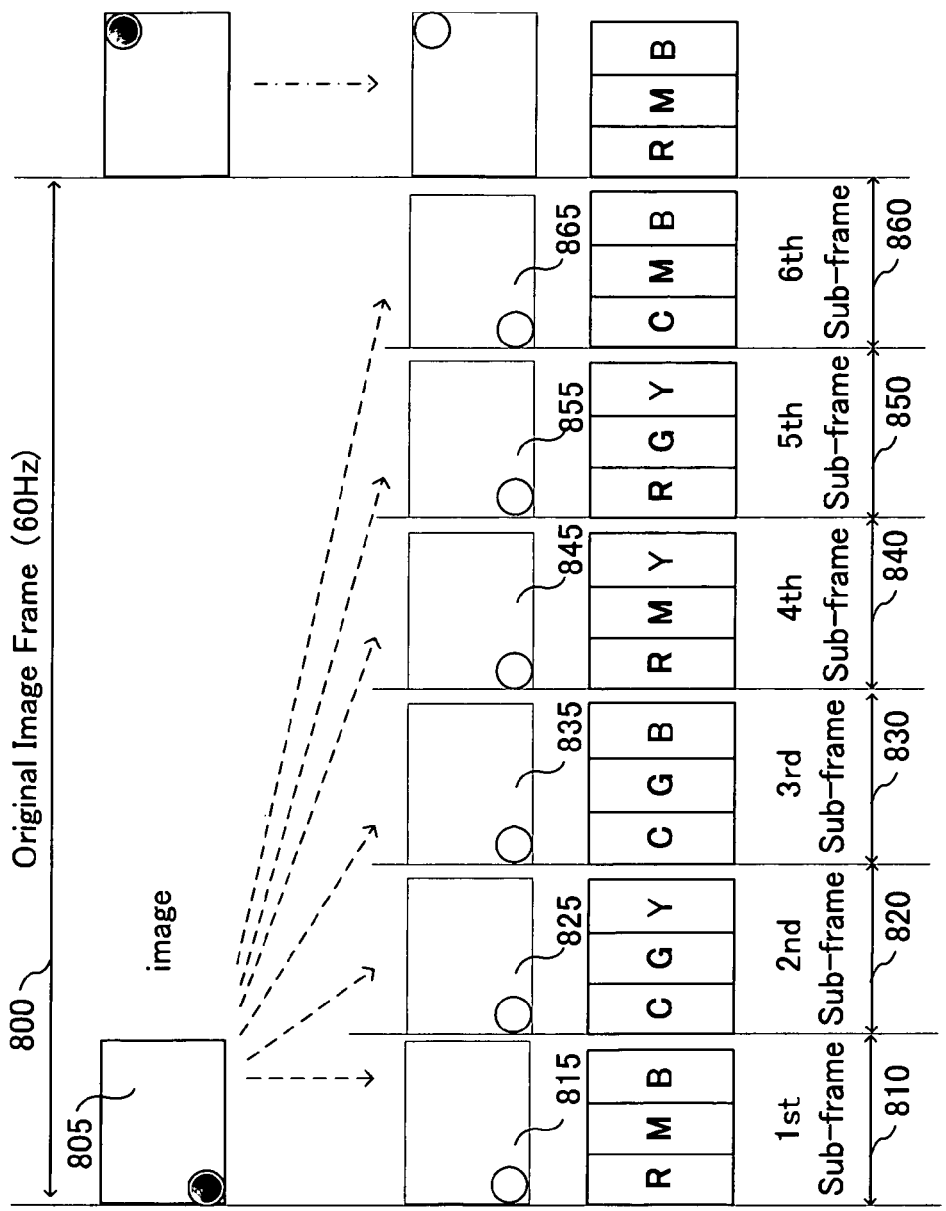
FIG. 22 is a diagram showing a yet another operation process of an image processing unit according to a preferred embodiment of the present invention.

FIG. 22 illustrates another case in which a frame signal with a 60 Hz frame rate is input, an example of a case in which the output sequence of color component signals determined on the basis of the content of a frame signal is variable for each complete cycle of outputting the respective color component signals.

Incidentally, a color filter 1023 controlled by the color filter controller 1022 may employ a color wheel, a color switch, or the like.

As described above, as in the case of changing the light source from a semiconductor light source to a white light source, using the video display apparatus 2001 configured as shown in FIG. 13 makes it possible to provide a function equivalent to that of the video display apparatus 1001 configured as shown in FIG. 13.

As such, the present invention is contrived to mix the reference color(s) emitted from the light source(s) included in an image display apparatus, matching the desired reference color(s), while suppressing the occurrence of color breakup to a minimum in the color sequential method. Therefore, this invention provides a video display apparatus for reproducing in high fidelity a color image represented by the input video signal.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A video display apparatus comprising:
an adjustable light source for emitting a plurality colors;
a color distribution determination circuit receives and applies an input video signal comprising a plurality of color data to determine and change a color distribution for displaying an image;
a control circuit receives the color distribution from the color determination circuit and applies the color distribution for controlling and changing the adjustable light source for displaying video images with color distribution determined and changed by the color distribution determination circuit; and
an image signal processing unit receives the input video signal including input frame signals the image signal processing unit further processes each of the input frame signals into a plurality of output sub-frame signals with a number of the output sub-frame signals greater than a number of the input frame signals.

2. The video display apparatus according to claim 1 further comprising:
the image signal processing unit further processes the input frame signals to generate the output sub-frame signals and changing the color distributions for each of the output sub-frame signals.

3. The video display apparatus according to claim 1, wherein:
the control circuit further controls and adjusts an emission light intensity of the adjustable light source for each of the sub-frames.

4. The video display apparatus according to claim 1, wherein:
the control circuit further receives a gray scale data to control and adjust an emission light intensity of the adjustable light source for each of the sub-frames in accordance with the gray scale data.

5. The video display apparatus according to claim 1, wherein:
the adjustable light source further comprises a plurality of sub-sources and the control circuit further applies the color distribution to control and adjust an emission light intensity of each of the light sources.

6. The video display apparatus according to claim 1, wherein:
the adjustable light source further includes a plurality of semiconductor light sources for emitting illumination lights of at least three primary colors.

7. The video display apparatus according to claim 1, wherein:
the adjustable light source further includes a plurality of semiconductor light sources for emitting illumination lights of at least six colors.

8. The video display apparatus according to claim 1, wherein:
the adjustable light source further includes a plurality of semiconductor light sources for emitting illumination lights of at least nine colors.

9. The video display apparatus according to claim 1, wherein:
the adjustable light source further comprises a plurality of sub-sources; and
the control circuit further controls at least one or more of the sub-sources to emit light for one of the output sub-frame.

10. The video display apparatus according to claim 1, wherein:
the adjustable light source further comprises a plurality of sub-sources; and
the control circuit further control at least two or more of the sub-sources to emit light for one of the output sub-frame.

11. A video display apparatus comprising:
an adjustable light source comprising a plurality of adjustable sub-sources for emitting a plurality of lights with different colors;
a color distribution determination circuit receives and applies an input video signal comprises a plurality of color data for determining a color distribution for displaying an image;
a control circuit receives the color distribution from the color distribution circuit and applies the color distribution for changing the emission sequence of the sub-sources within one frame for displaying an image according to an output sequence generated and controlled by the control circuit;
the light source comprising the sub-sources emitting the lights of at least a primary color and a color complementary to the primary color; and
an image signal processing unit receives the input video signal including input frame signals, the image signal processing unit further processes each of the input frame signals into a plurality of output sub-frame signals with a number of the output sub-frame signals greater than a number of the input frame signals.

12. The video display apparatus according to claim 11, wherein:
   the control circuit receives and applies sub-frame signals to display a sub-frame image for at least one of the sub-frames with one of the primary colors.

13. The video display apparatus according to claim 11, wherein:
   the control circuit for applies the sub-frame signals to display a sub-frame image for at least one of the sub-frames with one of the primary colors and at least another sub-frames with a complimentary color.

14. The video display apparatus according to claim 11, wherein:
   the control circuit for applying the sub-frame signals to change the output sequences of a sub-frame for displaying a sub-frame video image of the primary color and a sub-frame of the complementary color.

15. The video display apparatus according to claim 11, wherein:
   the control circuit to control the light sources for emitting the three primary colors to combine and generate a complementary color.

16. The video display apparatus according to claim 11, further comprising:
   a setup circuit for receiving an input video signal including a gray scale data to control an output sequence for displaying an image in accordance with the gray scale data.

17. A video display apparatus comprising:
   an adjustable light source comprising a plurality of adjustable sub-sources for emitting a plurality of lights with different colors;
   a color distribution determination circuit receives and applies an input video signal comprises a plurality of color data for determining a color distribution for displaying an image;
   a control circuit receives the color distribution from the color distribution circuit and applies the color distribution for changing the emission sequence of the sub-sources within one frame for displaying an image according to an output sequence generated and controlled by the control circuit: a setup circuit for receiving an input video signal including a gray scale data to control an output sequence for displaying an image in accordance with the gray scale data;
   the setup circuit further changes the output sequences when the video display apparatus receives a signal to operate in a color emphasis mode.

* * * * *